(12) United States Patent
Yasumura et al.

(10) Patent No.: US 7,707,724 B2
(45) Date of Patent: May 4, 2010

(54) MANUFACTURING METHOD FOR A DRIVE WHEEL ROLLING BEARING UNIT AND MANUFACTURING APPARATUS THEREFOR

(75) Inventors: Masahiro Yasumura, Fujisawa (JP); Shoji Horike, Fujisawa (JP)

(73) Assignee: NSK Ltd., Tokyo (JP)

( * ) Notice: Subject to any disclaimer, the term of this patent is extended or adjusted under 35 U.S.C. 154(b) by 879 days.

(21) Appl. No.: 11/085,043

(22) Filed: Mar. 22, 2005

(65) Prior Publication Data
US 2005/0223557 A1    Oct. 13, 2005

(30) Foreign Application Priority Data
Apr. 9, 2004  (JP) .............................. 2004-115864

(51) Int. Cl.
*B23P 17/00* (2006.01)
*B21D 53/10* (2006.01)
*B21D 39/00* (2006.01)
*F16C 13/00* (2006.01)

(52) U.S. Cl. ...................... 29/898.07; 29/898; 29/724; 29/507; 384/544

(58) Field of Classification Search ................ 29/507, 29/512, 724, 725, 898, 898.04, 898.07; 384/544
See application file for complete search history.

(56) References Cited

U.S. PATENT DOCUMENTS

| | | | | |
|---|---|---|---|---|
| 5,906,127 | A * | 5/1999 | Nakamura | ............. 72/85 |
| 6,672,769 | B2 | 1/2004 | Toda et al. | |
| 2001/0019223 | A1* | 9/2001 | Kaneko | ........... 301/105.1 |
| 2004/0093732 | A1 | 5/2004 | Toda et al. | |

FOREIGN PATENT DOCUMENTS

| | | |
|---|---|---|
| JP | 2002-89572 | 3/2002 |
| JP | 2002-283804 | 10/2002 |
| JP | 2002-317824 | 10/2002 |
| JP | 2002-327715 | 11/2002 |
| JP | 2003-139174 | 5/2003 |

* cited by examiner

*Primary Examiner*—David P Bryant
*Assistant Examiner*—Alexander P Taousakis
(74) *Attorney, Agent, or Firm*—Crowell & Moring LLP

(57) ABSTRACT

To avoid a difficulty of inserting a spline shaft into a spline hole, respective holding members 29 constituting a holding device 28 for holding a hub 3 are displaced in a radial inward direction of a small diameter stepped portion 15. The inner peripheral surface of the inside end of an original hole 25 is elastically deformed radially inward the same as or slightly greater than the elastic deformation caused by externally securing tightly an inner ring to the small diameter stepped portion 15. In this condition, a female spline portion for constituting a spline hole is formed in the original hole 25.

4 Claims, 30 Drawing Sheets

PRIOR ART

PRIOR ART

PRIOR ART

MANUFACTURING METHOD FOR A DRIVE WHEEL ROLLING BEARING UNIT AND MANUFACTURING APPARATUS THEREFOR

FIELD OF THE INVENTION

The present invention relates to a manufacturing method for a drive wheel rolling bearing unit which rotatably supports a drive wheel (the front wheel of a front engine front wheel drive vehicle, the rear wheel of a front engine, middle engine or rear engine, rear wheel drive vehicle, and both wheels of a four wheel drive vehicle) supported on an independent suspension system, with respect to the suspension system, and is used for driving to rotate the drive wheel, and also relates to improvement in a manufacturing apparatus therefor.

BACKGROUND OF THE INVENTION

In order to rotatably support a wheel with respect to the suspension system, there are used various kinds of drive wheel rolling bearing units in which an outer ring and an inner ring are rotatably combined together through rolling elements. For example, in Japanese Unexamined Patent Publication No. 2003-139174, a drive wheel rolling bearing unit 1 as shown in FIGS. 23 and 24 is described. This drive wheel rolling bearing unit 1 comprises an outer ring 2, and a hub 3 and an inner ring 4 which are rotatably supported on the inner diameter side of the outer ring 2 through a plurality of rolling elements 5. Out of these members, the outer ring 2 is securely connected to a knuckle 7 constituting a suspension system by the use of a first flange 6 provided on the outer peripheral surface thereof, and is not rotated even when used. Moreover, on the inner peripheral surface of the outer ring 2, there are provided double row outer ring raceways 8, so as to rotatably support the hub 3 and the inner ring 4 on the inner diameter side of the outer ring 2 concentrically with the outer ring 2.

The hub 3 is provided with a second flange 11 for supporting a wheel 9 constituting a vehicle wheel, and a disc 10 constituting a disc brake, on a portion towards the axial outside end of the outer peripheral surface ("outside" in relation to the axial direction, is the outside in the widthwise direction of the vehicle in a condition when assembled in the vehicle; the left side in the figures. The same applies throughout to this specification and claims). The wheel 9 and the disc 10 are fixedly connected to the outside surface of the second flange 11 by means of a stud 12 and a nut 13. A first inner ring raceway 14 is formed in a middle portion on the outer peripheral surface of the hub 3. The inner ring 4 which is formed with a second inner ring raceway 16 on the outer peripheral surface thereof, is externally fitted with an interference fit to a small diameter stepped portion 15, which is a fitting cylindrical surface portion and is formed on the axial inside end ("inside" in relation to the axial direction is the side towards the widthwise center when assembled in the vehicle; the right side in the figures. The same applies throughout to this specification and claims).

In the center of the hub 3, a spline hole 17 is provided. A spline shaft 19 constituting a constant velocity universal joint 18 is inserted into the spline hole 17 from the axial inside towards the outside. A nut 21 is screwed onto a male screw portion 20 which is provided in a portion protruded beyond the outside end surface of the hub 3 on the axially outside end portion of the spline shaft 19, and is further tightened, so that the constant velocity universal joint 18 and the drive wheel rolling bearing unit 1 are securely connected to each other. In this condition, the axial inside end surface of the inner ring 4 is abutted against the axial outside end surface of a constant velocity universal joint outer ring 22 constituting the constant velocity universal joint 18, so that the inner ring 4 is not displaced in a direction to come away from the small diameter stepped portion 15. At the same time, an appropriate preload is applied to the respective rolling elements 5.

The shapes, and the like, of the components of the constant velocity universal joint 18 are similar to those of a known constant velocity joint of a Rzeppa type or a Birfield type, and have nothing to do with the gist of the present invention. Therefore, detailed illustration and description are omitted. Moreover, as shown in FIG. 25, a structure where a cylindrical portion 23 existing on a portion protruded axially inside beyond the inner ring 4 which is fitted onto the small diameter stepped portion 15a on the axial inside end of the hub 3a is swaged and expanded (plastically deformed) radially outward to form a crimped portion 24, and the inside end surface of the inner ring 4 is clamped by the crimped portion 24, is described in Japanese Unexamined Patent Publication No. 2003-139174 and the like, and is heretofore well known. In the case of such a structure, an appropriate preload is applied to the respective rolling elements 5 in a condition with the inside end surface of the inner ring 4 clamped by the crimped portion 24.

The operations for forming the spline hole 17 in the center of the hubs 3 and 3a, and assembling the respective components, have been heretofore performed as follows, either for the case of the structure to clamp the inside end surface of the inner ring 4 by means of the constant velocity universal joint outer ring 22 as shown in the FIGS. 23 and 24, or for the case of the structure to clamp the inside end surface of the inner ring 4 by means of the crimped portion 24 as shown in the FIG. 25. The following description mainly focuses on the structure shown in FIGS. 23 and 24. Firstly, as shown in FIG. 26, before assembling the respective components including the inner ring 4 into the hub 3 (3a), a female spline portion for constituting the spline hole 17 as shown in FIG. 27 is formed by applying broaching to the inner peripheral surface of an original hole 25 which is provided in the center of the hub 3 (3a). Next, as shown in FIG. 28, in a condition with the respective components, excluding the inner ring 4, assembled into the hub 3 (3a), then as shown in FIG. 29, the inner ring 4 is externally secured to the small diameter stepped portion 15 which is provided on the axial inside end of the hub 3. Then, after forming the crimped portion 24 (refer to FIG. 25) if necessary, the drive wheel rolling bearing unit 1 and the constant velocity universal joint 18 are assembled to each other by inserting the spline shaft 19 constituting the constant velocity universal joint 18, into the spline hole 17 as shown in FIG. 23. In this manner, conventionally, the operation for forming the spline hole 17 in the center of the hub 3 (3a) has been performed before assembling the inner ring 4 into this hub 3 (3a).

However, if in this manner the inner ring 4 is externally secured to the small diameter stepped portion 15 after the processing for the spline hole 17, it is unavoidable that the axial inside end of the spline hole 17 is contracted radially inward although slightly. That is, since the inner ring 4 is externally secured to the small diameter stepped portion 15 (with the inner diameter A of the inner ring 4 in the free state< the outer diameter B of the small diameter stepped portion 15 in the free state), a large force directed radially inwards acts around the whole periphery of the small diameter stepped portion 15 which is relatively thin when fitted. Then due to such a force, the axial inside end of the spline hole 17 is deformed radially inward as shown exaggerated in FIG. 29, and the diameter of the inner peripheral surface of the axial inside end of the spline hole 17 is contracted (the inner diameter of the inscribed circle of the female spline grooves and female spline teeth and the overpin diameter are contracted). When the diameter of the inner peripheral surface of the axial inside end of the spline hole 17 is contracted in this manner, it becomes difficult to insert the spline shaft 19 into the spline hole 17, and the assembly operation for the drive wheel rolling bearing unit 1 and the constant velocity universal joint 18 becomes difficult to perform.

In order to avoid this inconvenience, Japanese Unexamined Patent Publication No. 2002-317824 discloses an invention wherein a female spline portion for constituting the spline hole 17 is formed in a condition where the inner ring 4 or a jig having an equivalent inner peripheral surface, is externally secured to the small diameter stepped portion 15. That is, by externally securing the inner ring 4 or the jig to the small diameter stepped portion 15 in this manner, the axial inside end of the spline hole 17 is elastically deformed in the same condition as where the inner ring 4 is externally fitted tightly to the small diameter stepped portion 15. Then, by forming the female spline portion in this condition, the female spline portion is formed with compensation for the deformation which is caused by externally fitting tightly the inner ring 4 to the small diameter stepped portion 15. Therefore, the difficulty of performing the assembling operation for the wheel drive rolling bearing unit 1 and the constant velocity universal joint 18, caused by the difficulty of inserting the spline shaft 19 into the spline hole 17 can be avoided.

However, in the case of forming the female spline portion in a condition with the inner ring 4 or the jig externally fitted to the small diameter stepped portion 15 in this manner, it is necessary to take off the inner ring 4 or the jig from the small diameter stepped portion 15 after forming the female spline portion 4. Such a procedure of taking off the inner ring 4 from the small diameter stepped portion 15 may cause damage to the respective peripheral surfaces due to rubbing between the inner peripheral surface of the inner ring 4 and the outer peripheral surface of the small stepped portion 15 because this inner ring 4 and the small stepped portion 15 are tightly fitted to each other. By forming the female spline portion in the center of the hub 3 in the condition where at least the outer ring 2, the respective driving elements 5, and the inner ring 4 are assembled into the hub 3, it becomes unnecessary to take off the inner ring 4 from the small stepped portion 15. However, when forming the female spline portion in the condition where the respective components 2, 4, and 5 are assembled in this manner, treatment to prevent cutting scraps caused by the process of forming the female spline portion, from entering the gap between the respective components 2, 4 and 5 becomes necessary, and an operation to rinse out these cutting scraps becomes more troublesome. Therefore this method is undesirable.

Moreover, as shown in the FIG. 22, in the abovementioned structure where the crimped portion 24 is formed on the inside end of the small diameter stepped portion 15*a*, Japanese Unexamined Patent Publication No. 2002-327715 discloses an invention to avoid the difficulty of inserting the spline shaft 19 into the spline hole 17 due to contraction of the inner diameter of the axial inside end of the spline hole 17 caused by the formation of the crimped portion 24. That is, in the case of the invention described in Japanese Unexamined Patent Publication No. 2002-327715, as shown in FIG. 30, by externally fitting tightly a jig 26 to the small diameter stepped portion 15*a*, the inner peripheral surface of the axial inside end of the spline hole 17 is elastically deformed in the same condition as when the crimped portion 24 (FIG. 22) is formed. Then, by forming the female spline portion for constituting the above spline hole 17 in this condition, this female spline portion is formed in a condition with compensation for the deformation caused by forming the crimped portion 24.

Also for the invention described in this Japanese Unexamined Patent Publication No. 2002-327715, it is necessary to take off the jig 26 from the small diameter stepped portion 15*a* after forming the female spline portion, similarly to the above invention described in Japanese Unexamined Patent Publication No. 2002-317824. Moreover, in the case of the invention described in Japanese Unexamined Patent Publication No. 2002-327715, since the inner peripheral surface of the axial inside end of the spline hole 17 is elastically deformed in the same condition as when the crimped portion 24 is formed, the interference between the inner peripheral surface of the jig 26 and the outer peripheral surface of the small diameter stepped portion 15*a* becomes greater. Therefore, damage of the outer peripheral surface of the small diameter stepped portion 15*a* becomes greater, and can be too much to ignore.

SUMMARY OF THE INVENTION

A manufacturing method for a drive wheel rolling bearing unit of the present invention and a manufacturing apparatus therefor, take the above problems into consideration and have been invented with the object of realizing a manufacturing method and an apparatus wherein a female spline portion can be formed with compensation for the deformation caused by externally securing an inner ring to the fitting cylindrical portion, and damage such as abrasion can be kept from occurring on the outer peripheral surface of the fitting cylindrical surface portion.

A drive wheel rolling bearing unit manufactured by the manufacturing method for a drive wheel rolling bearing unit and a manufacturing apparatus therefor of the present invention comprises an outer ring, a hub, an inner ring, and a plurality of rolling elements.

The outer ring has a first flange for securely connecting a suspension system to an outer peripheral surface, and double-row outer ring raceways on an inner peripheral surface.

Moreover, the hub has a spline hole in the center, a second flange for supporting and fixing a drive wheel, on an axial outside end side of the outer peripheral surface, a first inner ring raceway on an axial middle portion of an outer peripheral surface, and a fitting cylindrical surface portion on an axial inside end side of the outer peripheral surface.

Furthermore, the inner ring has a second inner ring raceway on the outer peripheral surface and is externally secured tightly to the fitting cylindrical surface portion.

Moreover, the plurality of rolling elements are rotatably provided respectively between the double row outer ring raceways and the first and second inner ring raceways.

In particular, in the manufacturing method for a drive wheel rolling bearing unit according to the present invention, prior to externally securing tightly the inner ring to the fitting cylindrical surface portion, this fitting cylindrical surface portion is held by a holding device, and an inner diameter of a portion of the holding device which holds this fitting cylindrical surface portion is contracted more than an outer diameter of this fitting cylindrical surface in a free state, so that the inner peripheral surface of the axial inside end of the spline hole is elastically deformed radially inward. For example, this inner peripheral surface of the axial inside end of the spline hole is elastically deformed the same as or slightly greater than an elastic deformation caused by externally securing tightly the inner ring to the fitting cylindrical surface portion. Alternatively, as required, the inner peripheral surface of the inside end of this spline hole is elastically deformed the same as or slightly greater than the elastic deformation caused by forming the crimped portion on the inside end of the fitting cylindrical surface portion. Then, after forming a female spline portion for constituting the spline hole in the condition of elastic deformation in this manner, the elastic deformation is released by expanding the inner diameter of the portion of the holding device which holds the fitting cylindrical surface portion, more than the outer diameter of the fitting cylindrical surface portion, after which the inner ring is externally secured tightly to the fitting cylindrical surface portion.

Moreover, the manufacturing apparatus for a drive wheel rolling bearing unit according to the present invention comprises: a holding device which can freely hold the fitting cylindrical surface portion and can freely expand and contract an inner diameter of a portion that holds this fitting cylindrical surface portion more than an outer diameter of the fitting cylindrical surface portion in a free state (freely expand and contract while sandwiching the outer diameter in the free state); and a cutting device for forming a female spline portion for constituting the spline hole. Then, the fitting cylindrical surface portion is held by the holding device, and an inner diameter of a portion of the holding device that holds the fitting cylindrical surface portion is contracted more than an outer diameter of the fitting cylindrical surface portion in a free state, so that the female spline portion is formed by the cutting device in a condition where the inner peripheral surface of the axial inside end of the spline hole is elastically deformed radially inward.

According to the manufacturing method for a drive wheel rolling bearing unit and a manufacturing apparatus therefor of the present invention, the female spline for constituting this spline hole is formed in a condition where the inner peripheral surface of the axial inside end of the spline hole is elastically deformed radially inward. Therefore, the female spline portion can be formed with compensation for the deformation caused by externally securing tightly the inner ring to the fitting cylindrical surface portion, and the deformation caused by forming the crimped portion on the axial inside end of this fitting cylindrical surface portion, and the operation for inserting the spline shaft into the spline hole can be kept from becoming troublesome. Moreover, after forming the female spline portion in the spline hole, the elastic deformation of the inner peripheral surface of the inside end of the spline hole is released by expanding the inner diameter of the portion of the holding device that holds the fitting cylindrical surface portion, more than the outer diameter of this fitting cylindrical surface portion. Therefore, damage such as abrasion caused by taking out the inner ring or the jig can be kept from occurring on the outer peripheral surface of the fitting cylindrical surface portion.

The amount of elastic deformation of the inner peripheral surface of the inside end of the spline hole may be readily adjusted by regulating the dimension of the inner diameter of the portion of the holding device that holds the fitting cylindrical surface portion.

Preferably, in the case of executing the manufacturing apparatus for the drive wheel rolling bearing unit of the present invention, the holding device has a plurality of holding members which are freely displaced in the radial direction of the fitting cylindrical surface portion, provided at equal intervals around the circumference direction of the fitting cylindrical surface portion. By displacing these holding members in the radial direction of the fitting cylindrical surface portion, the inner diameter of the portion of the holding device that holds the fitting cylindrical surface portion can be freely expanded and contracted more than the outer diameter of the fitting cylindrical surface portion in a free state.

In such a construction, a load directed radially inward on the outer peripheral surface of the fitting cylindrical surface portion can be applied to the outer peripheral surface of the fitting cylindrical surface portion, evenly around the circumference direction of this fitting cylindrical surface portion, with a simple structure, and the amount of elastic deformation of the inner peripheral surface of the axial inside end of the spline hole can be readily regulated to a desired condition.

BRIEF DESCRIPRION OF THE DRAWINGS

DETAILED DESCRIPTION OF THE INVENTION

First Example

Figure 23:
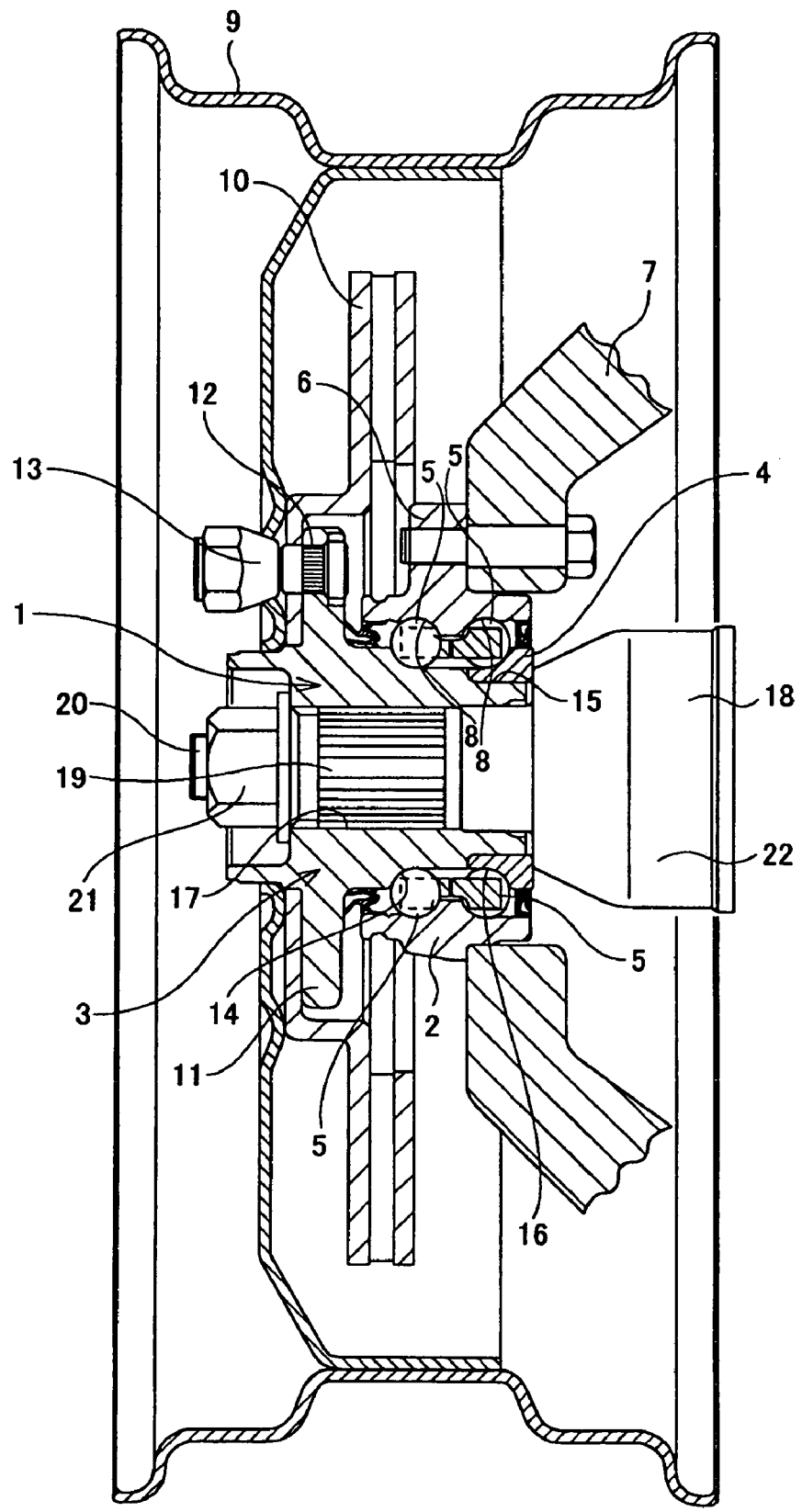
FIG. 23 is a cross-sectional view showing a first example of a drive wheel rolling bearing unit, being the object of the present invention, in a condition assembled into a suspension system.
Figure 24:
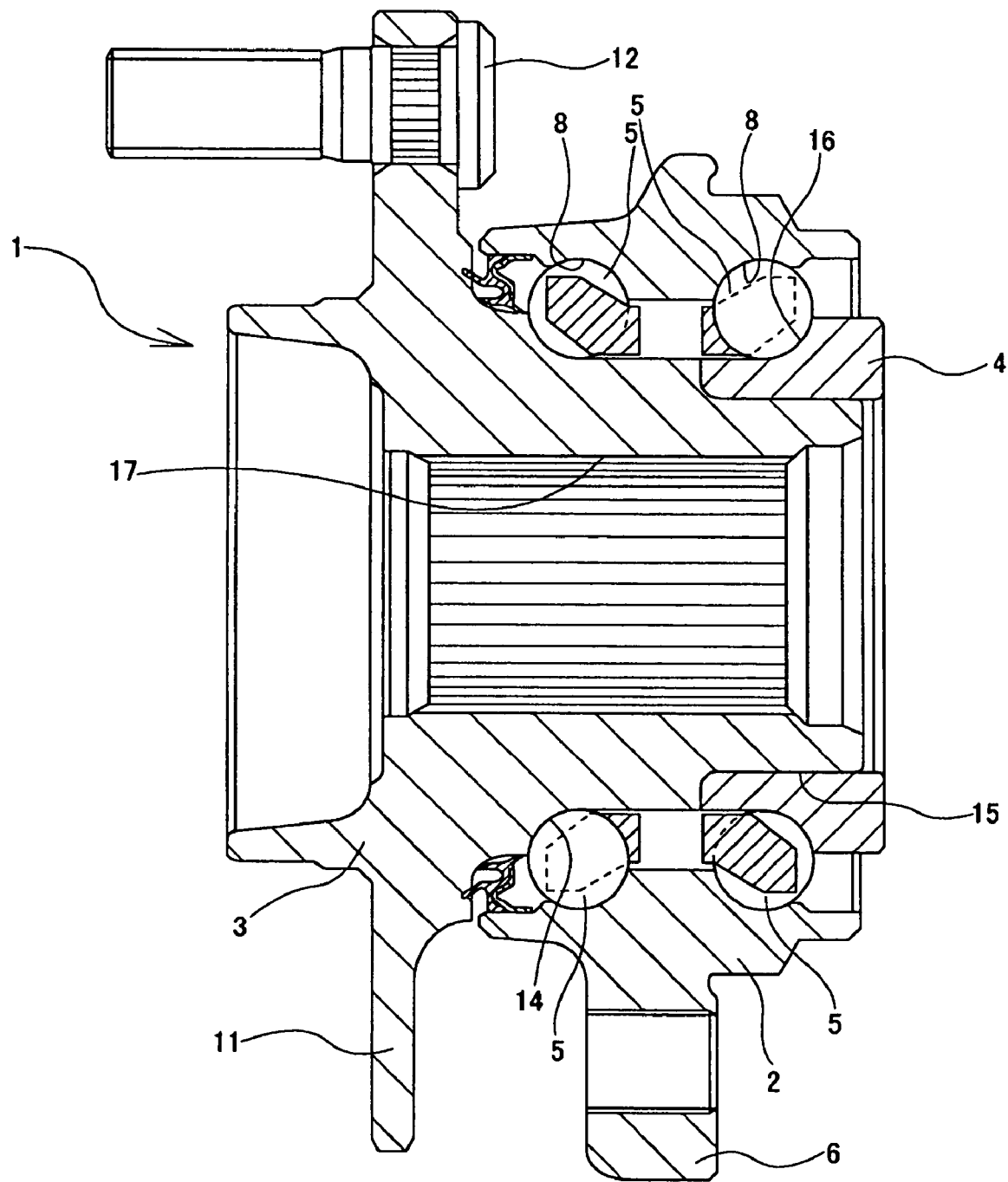
FIG. 24 is a cross-sectional view showing the drive wheel rolling bearing unit taken out.
Figure 25:
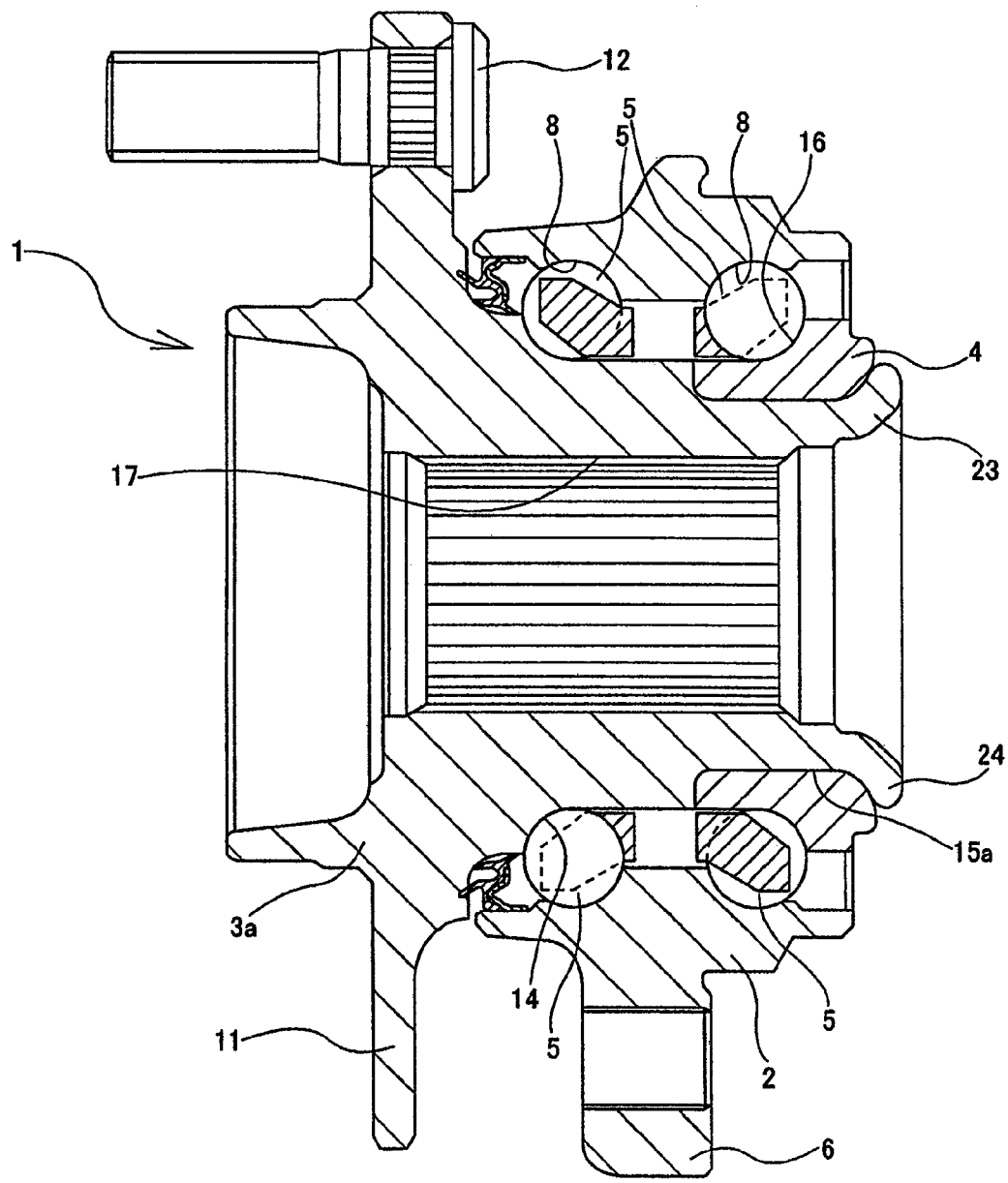
FIG. 25 is a cross-sectional view similar to FIG. 24, showing a second example of a conventional structure.
Figure 26:
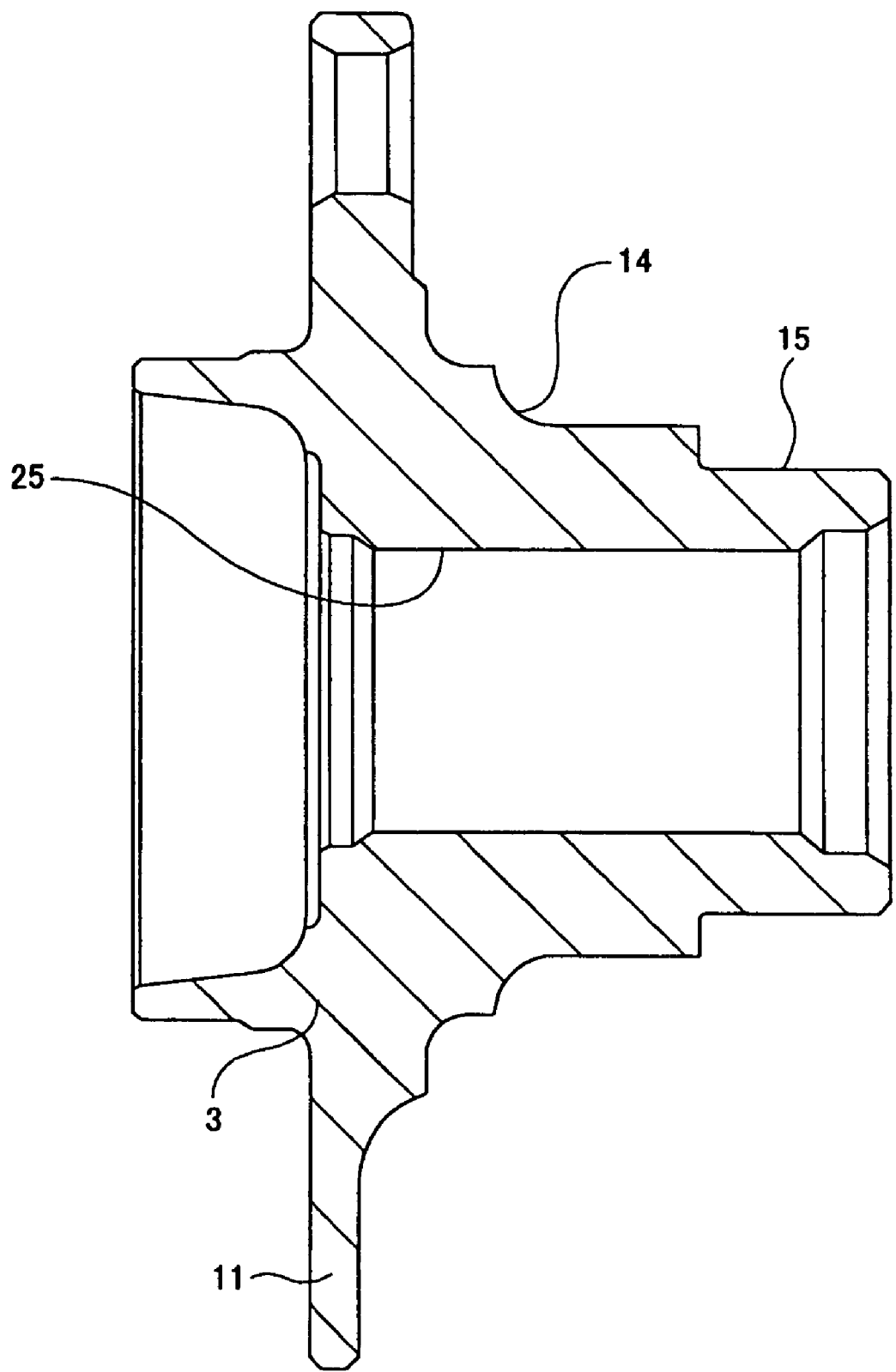
FIG. 26 is a cross-sectional view showing the hub before forming the female spline portion during manufacturing the drive wheel rolling bearing unit.
Figure 27:
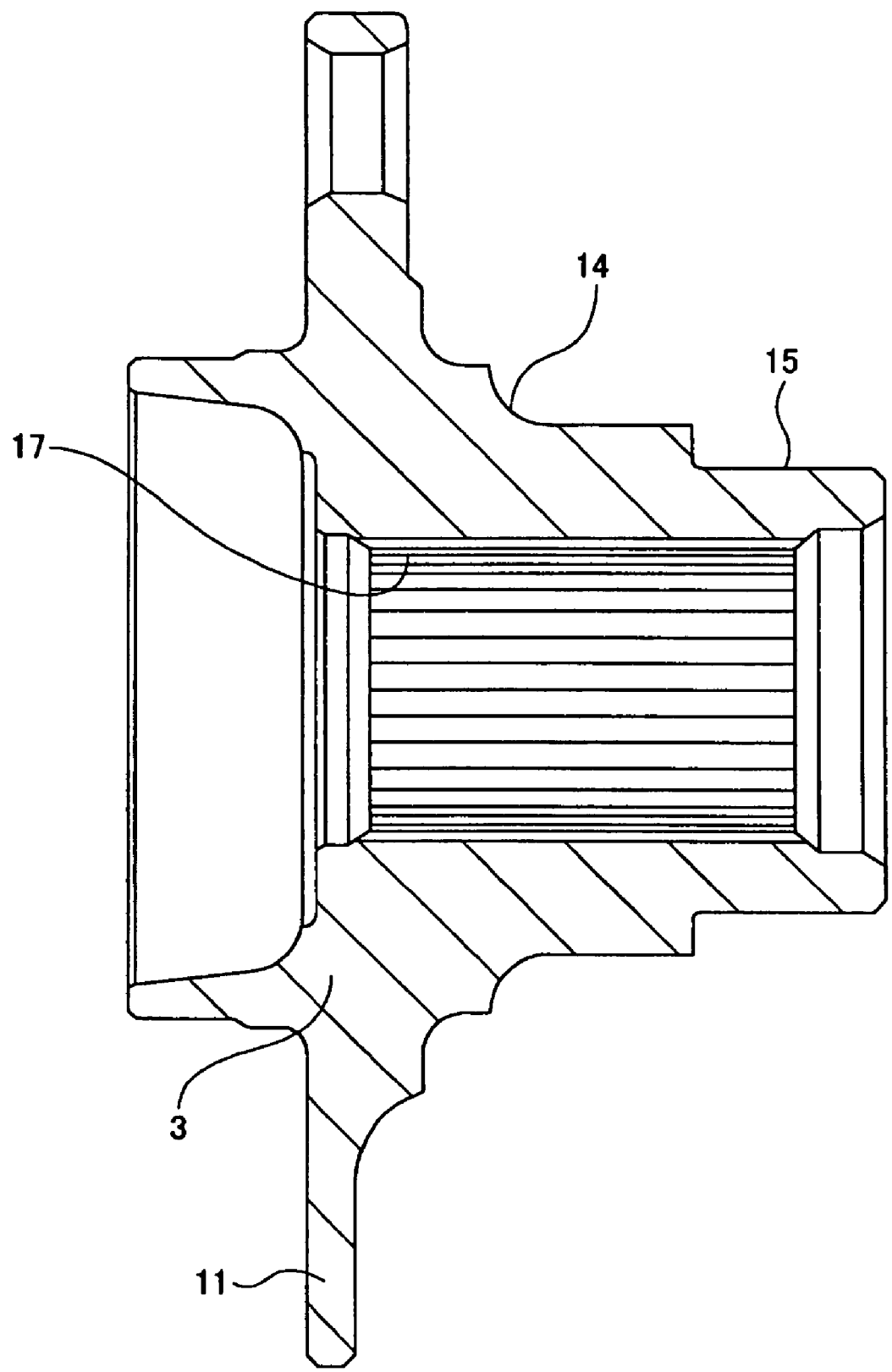
FIG. 27 is a cross-sectional view showing a condition where the female spline portion is formed.
Figure 28:
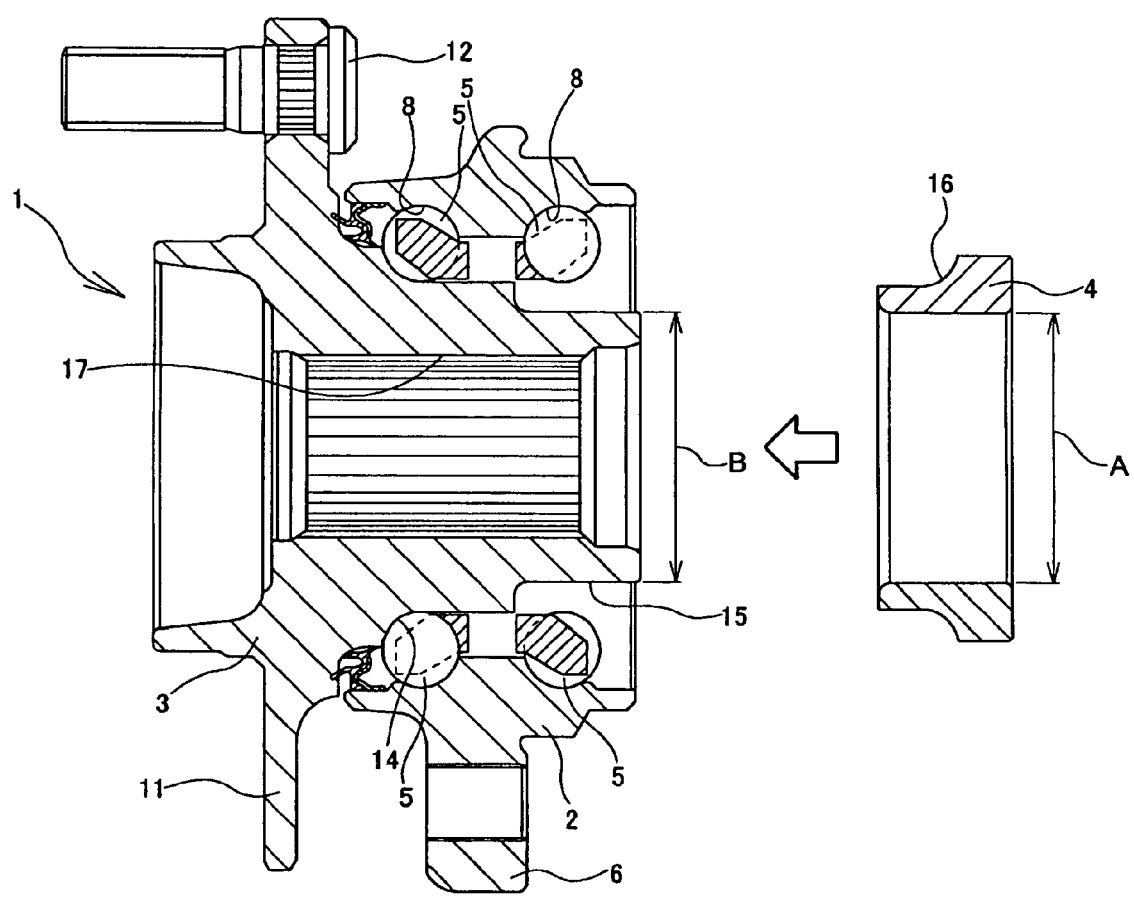
FIG. 28 is a cross-sectional view showing a condition where the respective components except for the inner ring are assembled into the hub.
Figure 29:
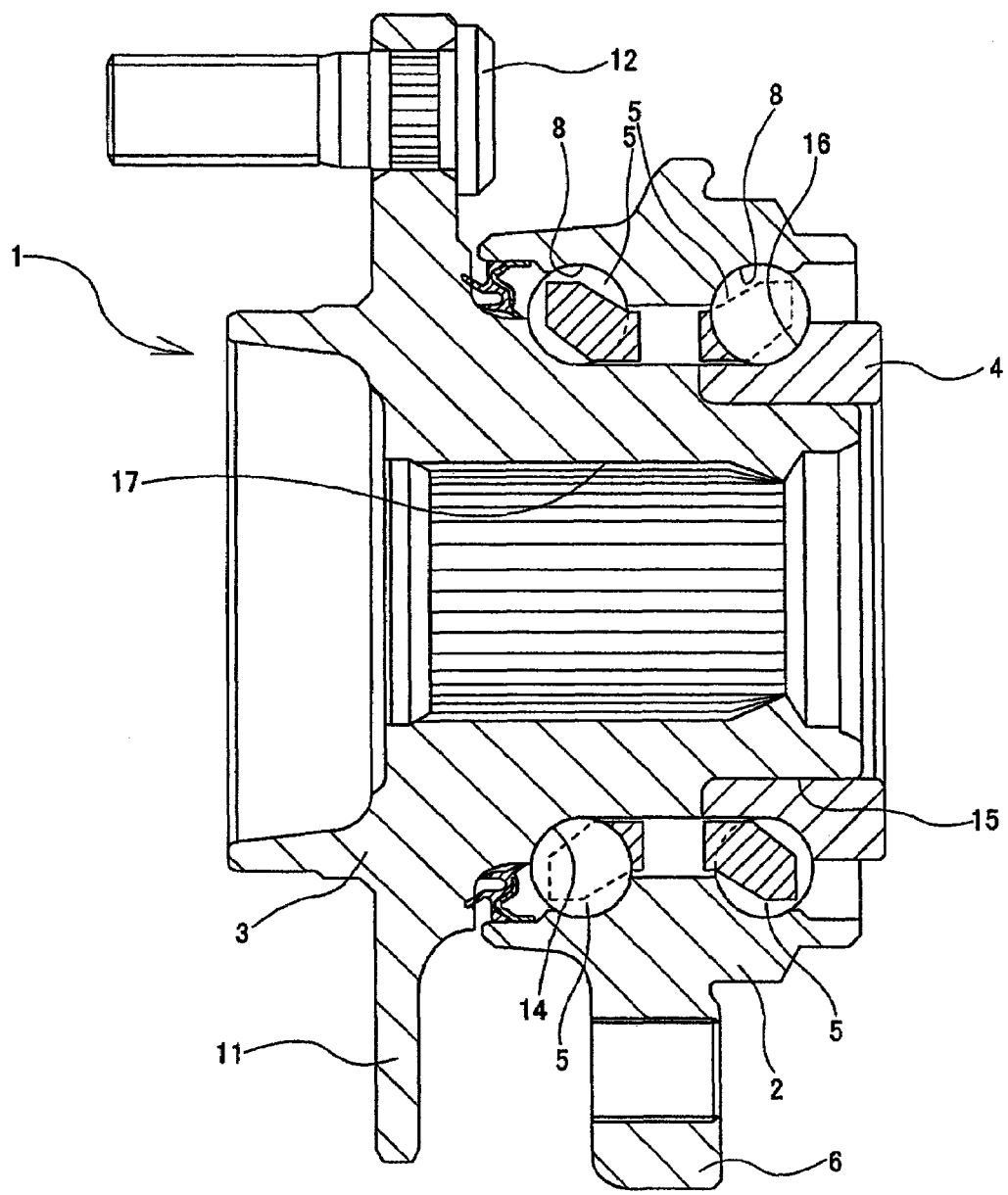
FIG. 29 is a cross-sectional view showing a condition where the inner ring is assembled into the hub.

FIG. 1 to 8 show a first example of the present invention. This example is characterized in that the processing method for the spline hole 17 and the structure of the processing apparatus for processing this spline hole 17 are contrived, in order to adjust the shape and dimension of the spline hole 17 formed in the center of the hub 3, and to keep the damage such as abrasion from occurring on the outer peripheral surface of the small diameter stepped portion 15, in the condition where the inner ring 4 is externally secured tightly to the exterior of the small diameter stepped portion 15 corresponding to the fitting cylindrical surface portion formed on the axial inside end of the hub 3. Since the basic structure of the drive wheel rolling bearing unit 1 itself is similar to the abovementioned structure shown in FIGS. 23 and 24, the description of equivalent components is omitted or simplified. Hereunder the description is of examples of the manufacturing method and the manufacturing apparatus of the present invention.

Figure 2:
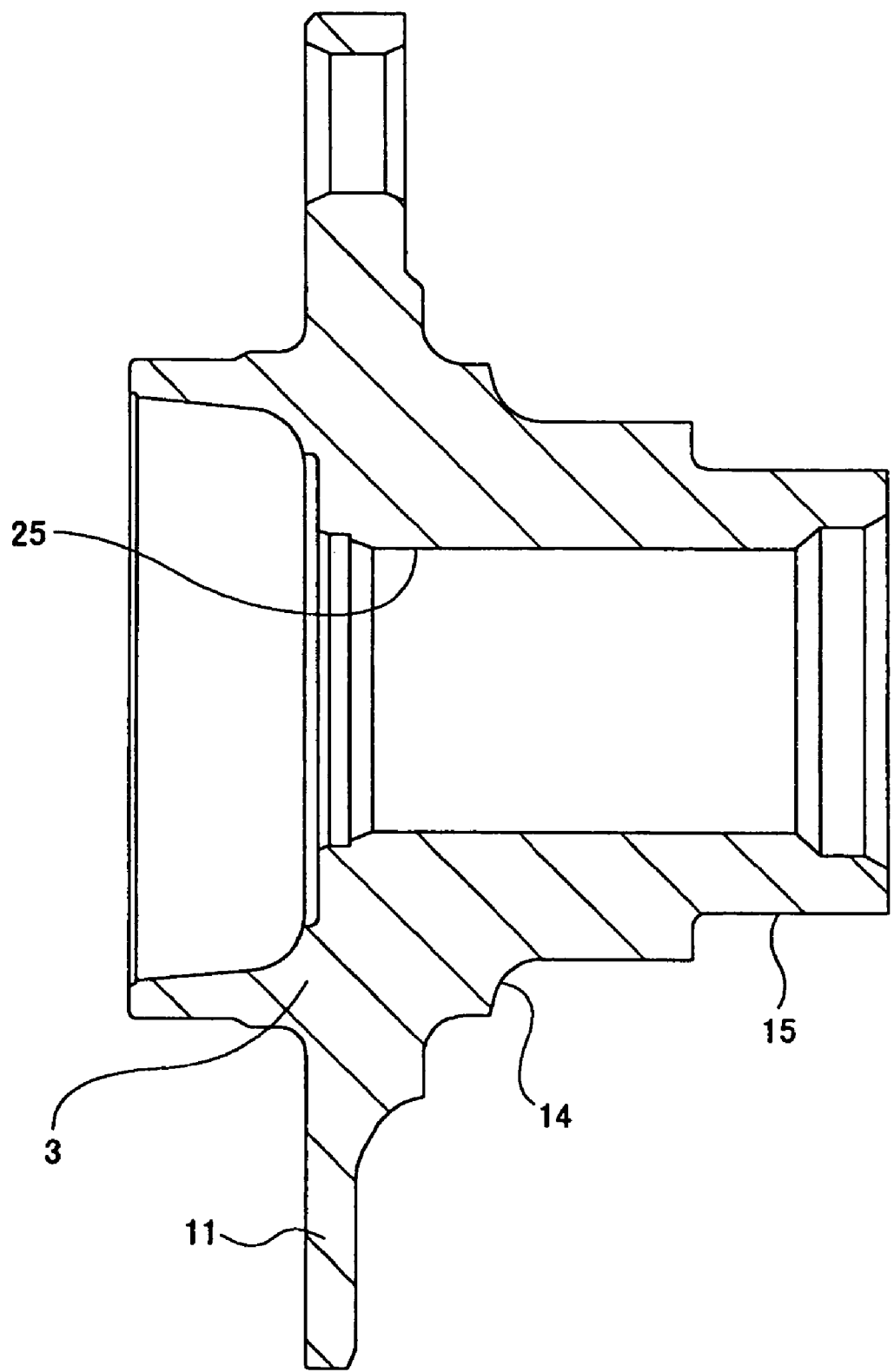
FIG. 2 is a cross-sectional view showing a hub before forming a female spline portion.
Figure 3:
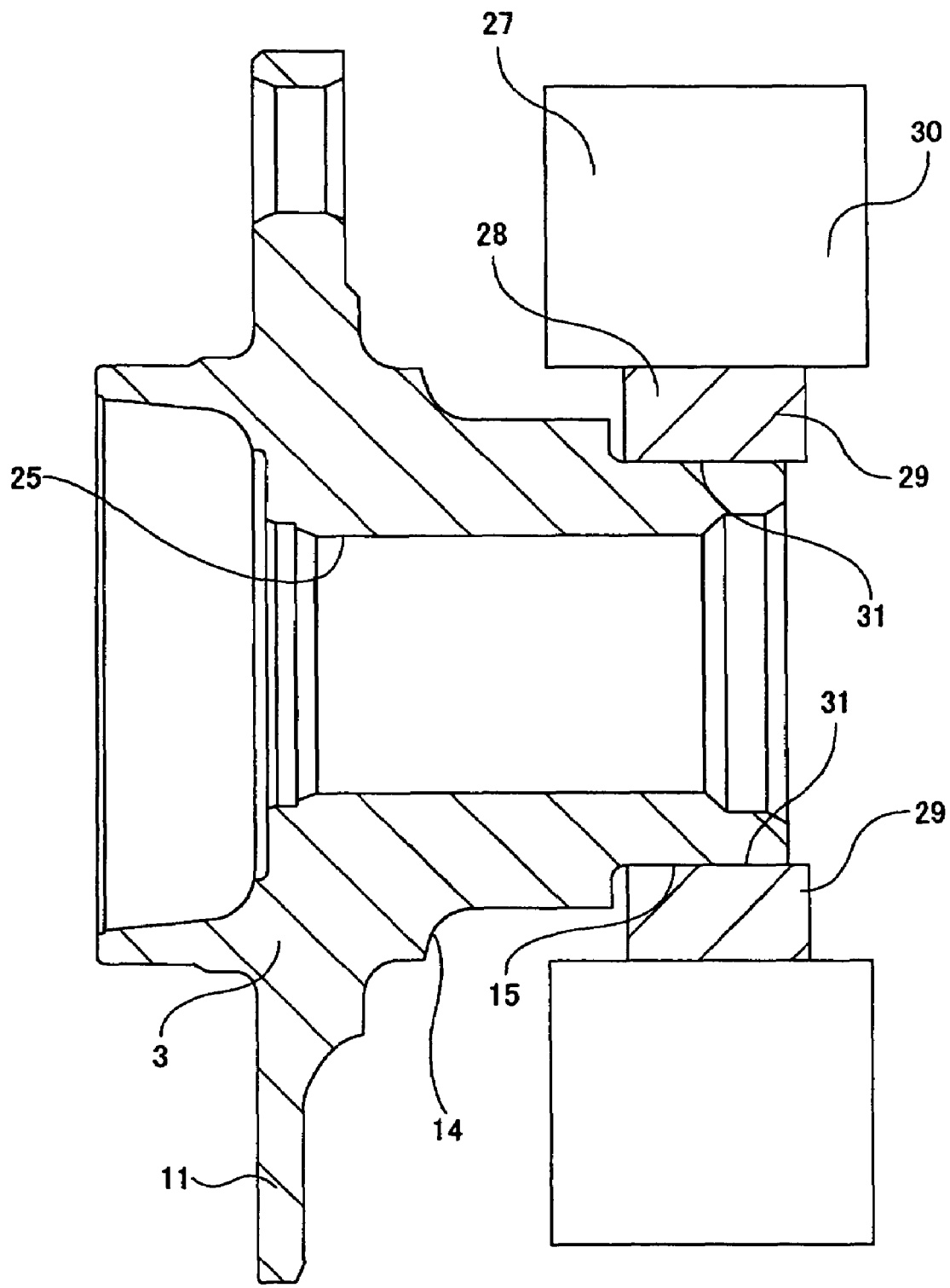
FIG. 3 is a cross-sectional view showing a condition where the hub is supported on a processing apparatus.

In the case of the manufacturing method of the present example, firstly as shown in FIG. 2, the hub 3 is formed by subjecting a cylindrical material to machining such as forging and turning, and as necessary, drilling, threading, and grinding, and then to surface treatment such as heat treatment and coating treatment. Next, prior to externally securing tightly the inner ring 4 to the small diameter stepped portion 15 provided on the inside end of the hub 3, as shown in FIG. 3, the hub 3 is supported in a processing apparatus 27 for forming a female spline portion on the inner peripheral surface of an original hole 25 provided in the center of the hub 3. This processing apparatus 27 corresponds to the manufacturing apparatus for the drive wheel rolling bearing unit of the present invention, and comprises: a holding device 28 which can freely hold the small diameter stepped portion 15 and can freely expand and contract the inner diameter of a portion that holds this small diameter stepped portion 15, more than the outer diameter of the small diameter stepped portion 15 in the free state; and a cutting device (not shown) for forming the female spline portion for constituting the spline hole 17, in the original hole 25. The cutting device of these comprises a broach for broaching the inner peripheral surface of the original hole 25, and forms the female spline portion on the inner peripheral surface of the original hole 25 by pushing this broach into the original hole 25 in the condition where the small diameter stepped portion 15 is held by the holding device 28.

The holding device 28 has a plurality (three to four) of holding members 29 which can be freely displaced in the radial direction of the small diameter stepped portion 15, provided at equal intervals around the circumference direction of the small diameter stepped portion 15, and has a structure like the chuck of a machine tool. The construction is such that the respective holding members 29 are equally displaced in synchronous with each other respectively in the radial direction of the small diameter stepped portion 15 (so that a load is applied equally in the radial direction of the small diameter stepped portion 15) by a driving device 30 such as a hydraulic cylinder. Inner surfaces 31 of the respective holding members 29 (the surface facing to and in contact with the outer peripheral surface of the small diameter stepped portion 15) are made a partially cylindrical surface having an approximately equal radius of curvature to the radius of the small diameter stepped portion 15. Then, by displacing the respective holding members 29 in the radial direction of the small diameter stepped portion 15, the inner diameter of the portion to hold this small diameter stepped portion 15, that is, the inner diameter of the intermittent cylindrical surface constituted by the inner surfaces 31 of the respective holding members 29, can be freely expanded and contracted more than the outer diameter of the small diameter stepped portion 15.

The inner surfaces 31 of the respective holding members 29, being the partially cylindrical surfaces respectively, preferably constitute a single cylindrical surface together in the condition where the respective holding members 29 are displaced the most inward in the radial direction of the small diameter stepped portion 15. In this condition, the inner diameter of the cylindrical surface constituted by these respective inner surfaces 31 is smaller than the outer diameter of the small diameter stepped portion 15 in the free state. In the case of the present example, in this condition, the dimension of the inner diameter of this cylindrical surface is made the same as or slightly smaller than that of the inner diameter of the inner ring 4 which is externally secured tightly to the small diameter stepped portion 15. By restricting the dimension of the inner diameter of the cylindrical surface in this manner, the amount of elastic deformation of the inner peripheral surface of the inside end of the original hole 25 (spline hole 17) can be adjusted to a desired value when forming the female spline portion described later. On the other hand, in the condition where the respective holding members 29 are displaced the most outward in the radial direction of the small diameter stepped portion 15, the diameter of the intermittent cylindrical surface constituted by the inner surfaces 31 of these respective holding members 29 becomes greater than the outer diameter of the small diameter stepped portion 15 (in the free state).

In the case where the hub 3 is attached to the processing apparatus 27 constituted as described above, firstly the respective holding members 29 constituting the holding device 28 are displaced outward in the radial direction of the small diameter stepped portion 15, so that the diameter of the intermittent cylindrical surface constituted by the inner surfaces 31 of these respective holding members 29 is made greater than the outer diameter of the small diameter stepped portion 15 in the free state. Then, in this state, the small diameter stepped portion 15 is inserted into the respective holding members 29, and the respective holding members 29 are displaced radially inward by the driving device 30, so that the inner surfaces 31 are in contact with the outer peripheral surface of the small diameter stepped portion 15. In this condition, as shown in FIG. 3, the hub 3 is held (supported) in the holding device 28 constituting the processing apparatus 27. Then in the case of this example, the respective holding members 29 are displaced from this condition further inward in the radial direction of the small diameter stepped portion 15 by the driving device 30, so as to apply a load radially inward onto the small diameter stepped portion 15.

Figure 4:
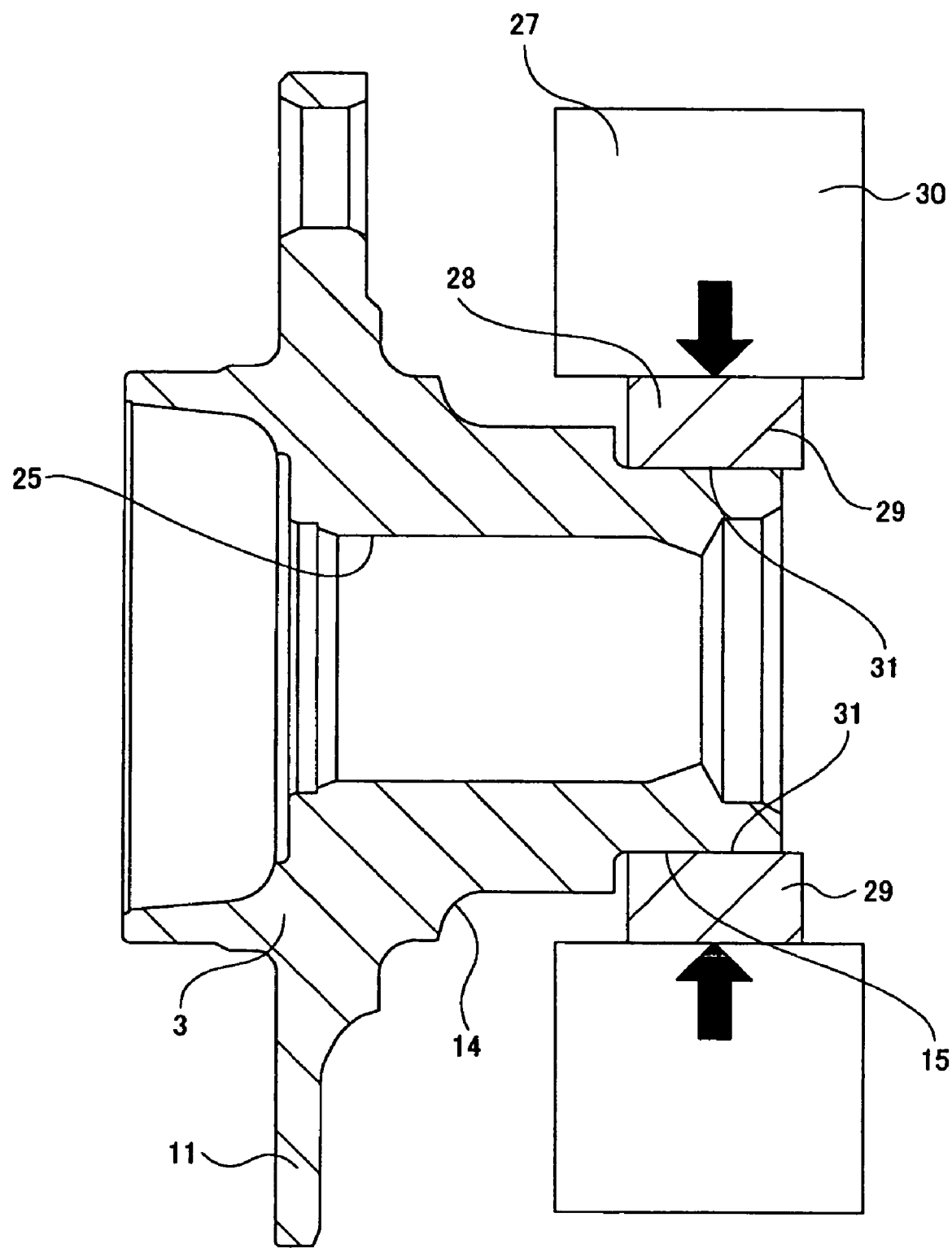
FIG. 4 is a cross-sectional view showing a condition where an inner peripheral surface of an axial inside end of a spline hole is elastically deformed by a holding device.

That is, the inner diameter of the intermittent cylindrical surface constituted by the inner surfaces 31 of the respective holding members 29 is made smaller than the outer diameter of the small diameter stepped portion 15, so as to, as shown exaggerated in FIG. 4, elastically deform the inner peripheral surface of the axial inside end of the original hole 25 radially inward. In the case of this example, as described above, the inner surfaces 31 of the respective holding members 29 constitute a single cylindrical surface together in the condition where the respective holding members 29 are displaced the most inward in the radial direction of the small diameter stepped portion 15. In this condition, the inner diameter of this single cylindrical surface becomes the same as or slightly smaller than that of the inner diameter of the inner ring 4. Therefore, in the condition where the respective holding members 29 are displaced in this manner, the inner peripheral surface of the inside end of the original hole 25 is elastically deformed the same as or slightly greater than the elastic deformation caused by externally securing tightly the inner ring 4 to the small diameter stepped portion 15. In this condition, a portion at the inner peripheral surface of the axial inside end of the original hole 25 which is superimposed axially by the respective holding members 29, is protruded radially inward from the other portion around the whole periphery.

Figure 5:
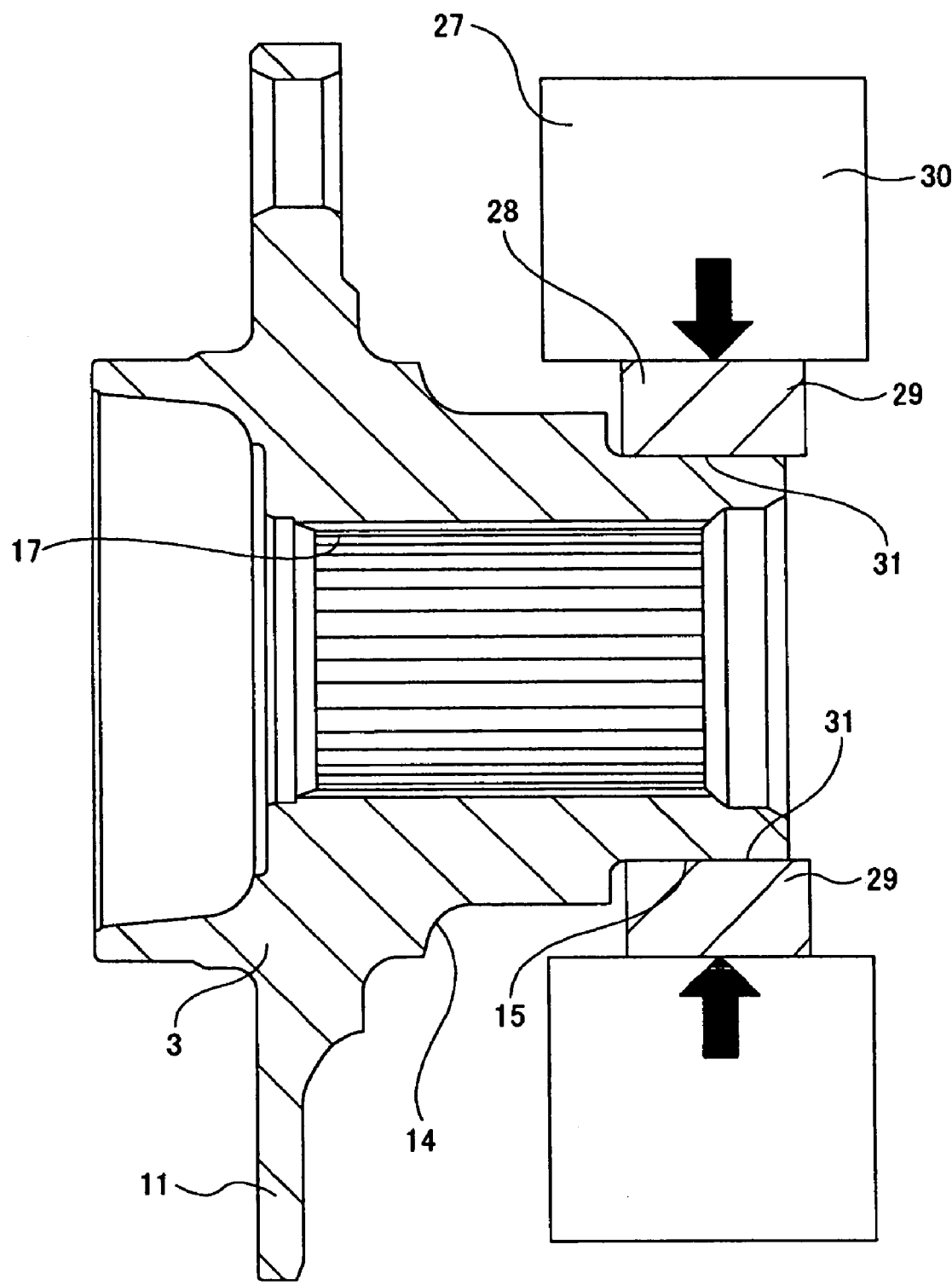
FIG. 5 is a cross-sectional view showing a condition where a female spline portion is formed.

Then, in the condition where the inner peripheral surface of the inside end of the original hole 25 is elastically deformed in this manner, the broach constituting the cutting device is pushed into this original hole 25, so as to make the spline hole 17 as shown in FIG. 5. By providing round teeth on the broach, the tip surfaces of the respective female spline teeth constituting the female spline portion may be processed at the same time as when forming the female spline portion. Moreover, in addition to the wet processing using a normal cutting oil or cutting fluid, considering the environment, semi-dry processing using less normal cutting oil or cutting fluid and dry processing using no normal cutting oil nor cutting fluid may be employed for such broaching. In the condition where the female spline portion is formed in this manner, the inner peripheral surface of the spline hole 17 becomes even over the axial direction (there is no portion protruded radially inward).

Figure 6:
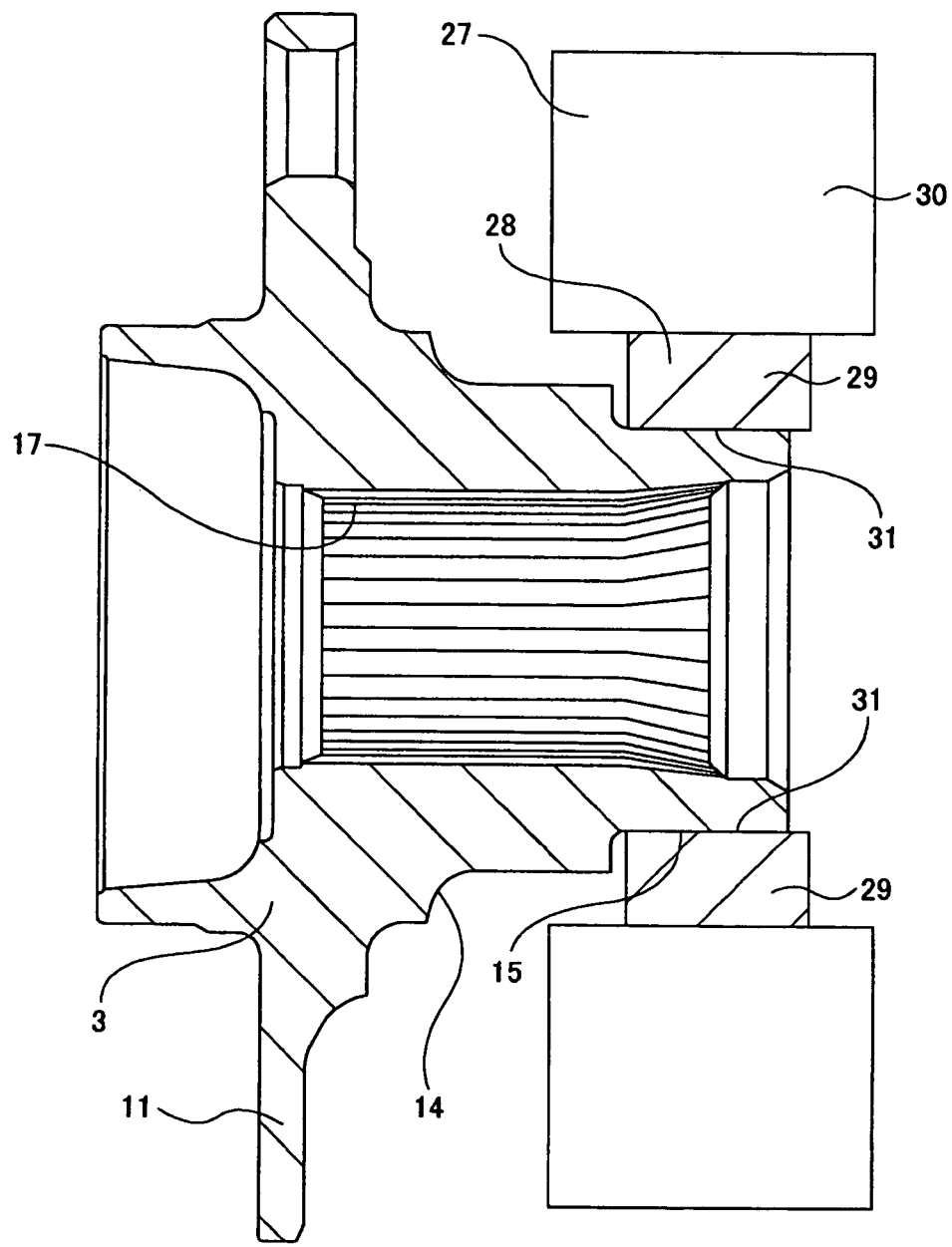
FIG. 6 is a cross-sectional view showing a condition where the elastic deformation of the inner peripheral surface of the inside end of the spline hole is released.
Figure 7:
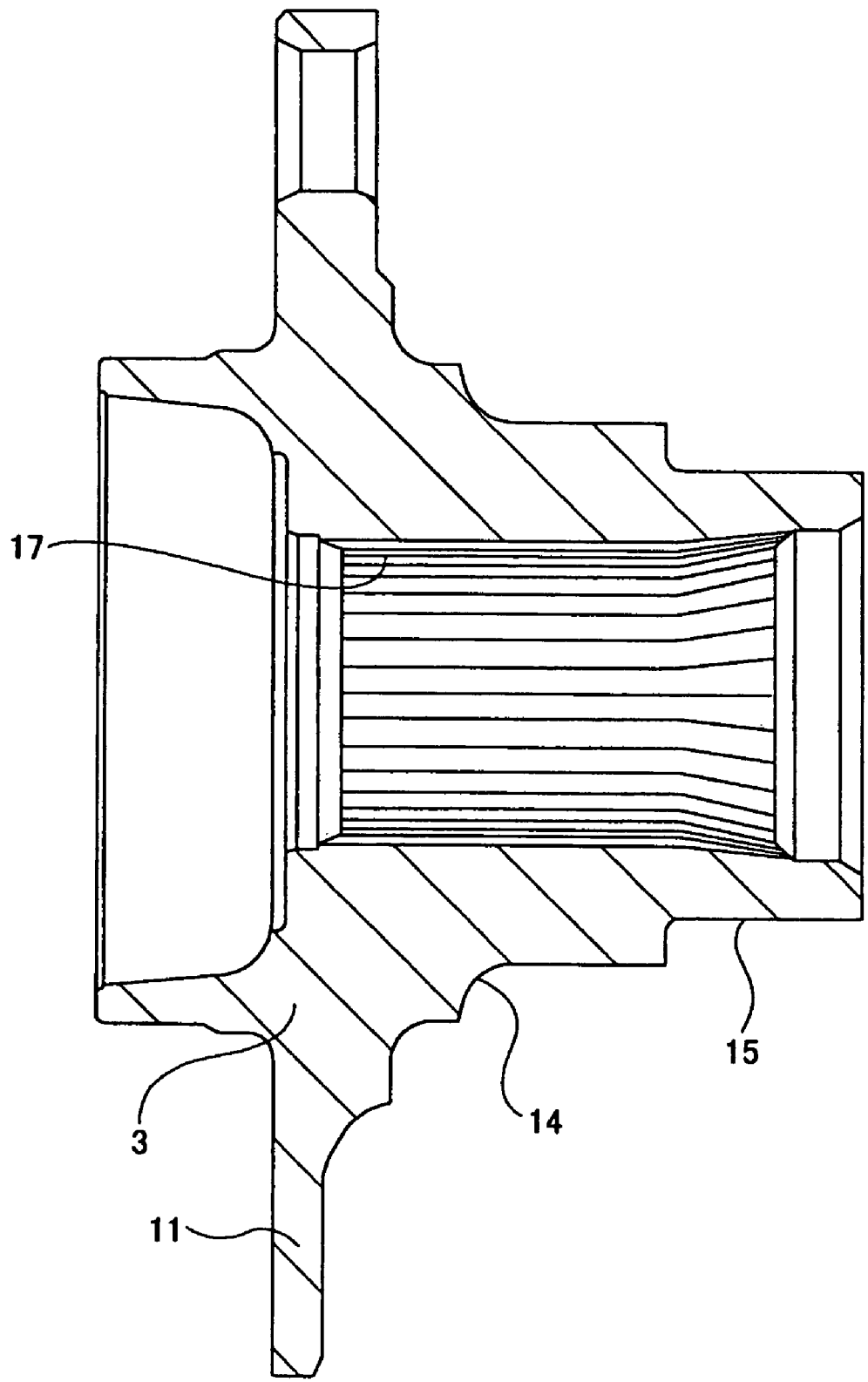
FIG. 7 is a cross-sectional view showing a condition where the hub is taken out from the processing apparatus.

After forming the female spline portion in this manner, then as shown in FIG. 6, the respective holding members 29 are displaced outward in the radial direction of the small diameter stepped portion 15, so as to enlarge the diameter of the inscribed circle of the inner surfaces 31 of these the respective holding members 29 more than the outer diameter of the small diameter stepped portion 15. Then as shown in FIG. 7, the hub 3 is taken out from the holding device 28. In this condition, the inner peripheral surface of the axial inside end of the spline hole 17 is slightly inclined in the direction such that the outer diameter increases progressing axially inward. That is, as described above, since the female spline portion is formed in the condition where the inner peripheral surface of the inside end of the spline hole 17 is elastically deformed radially inward, most of the portion which is elastically deformed in this manner is cut out. Therefore, in the condition where the respective holding members 29 are displaced radially outward to release the elastic deformation, the inner peripheral surface of the axial inside end of the spline hole 17 is inclined in the above manner.

Figure 1:
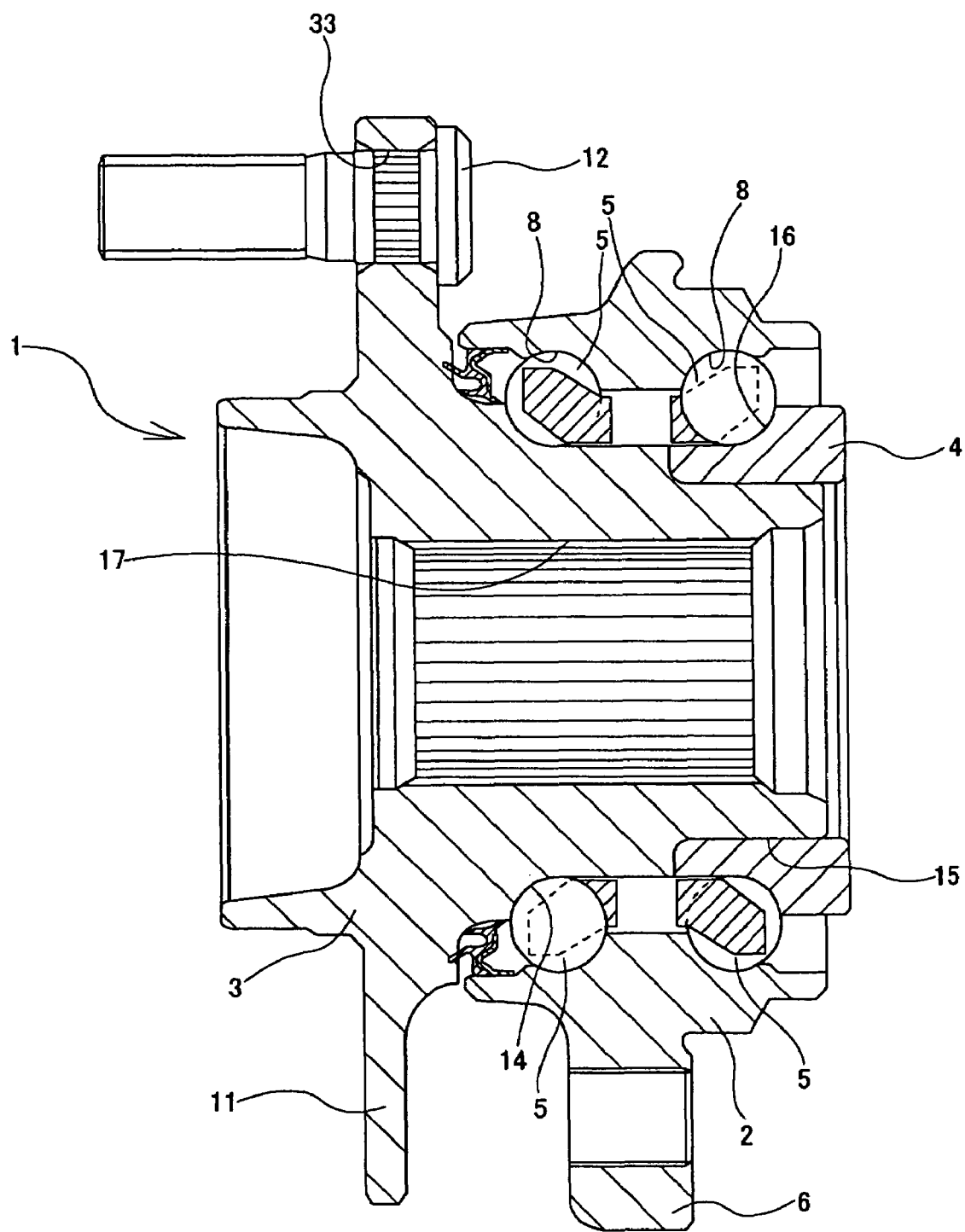
FIG. 1 is a cross-sectional view showing a drive wheel rolling bearing unit manufactured by a method of a first example of the present invention.
Figure 8:
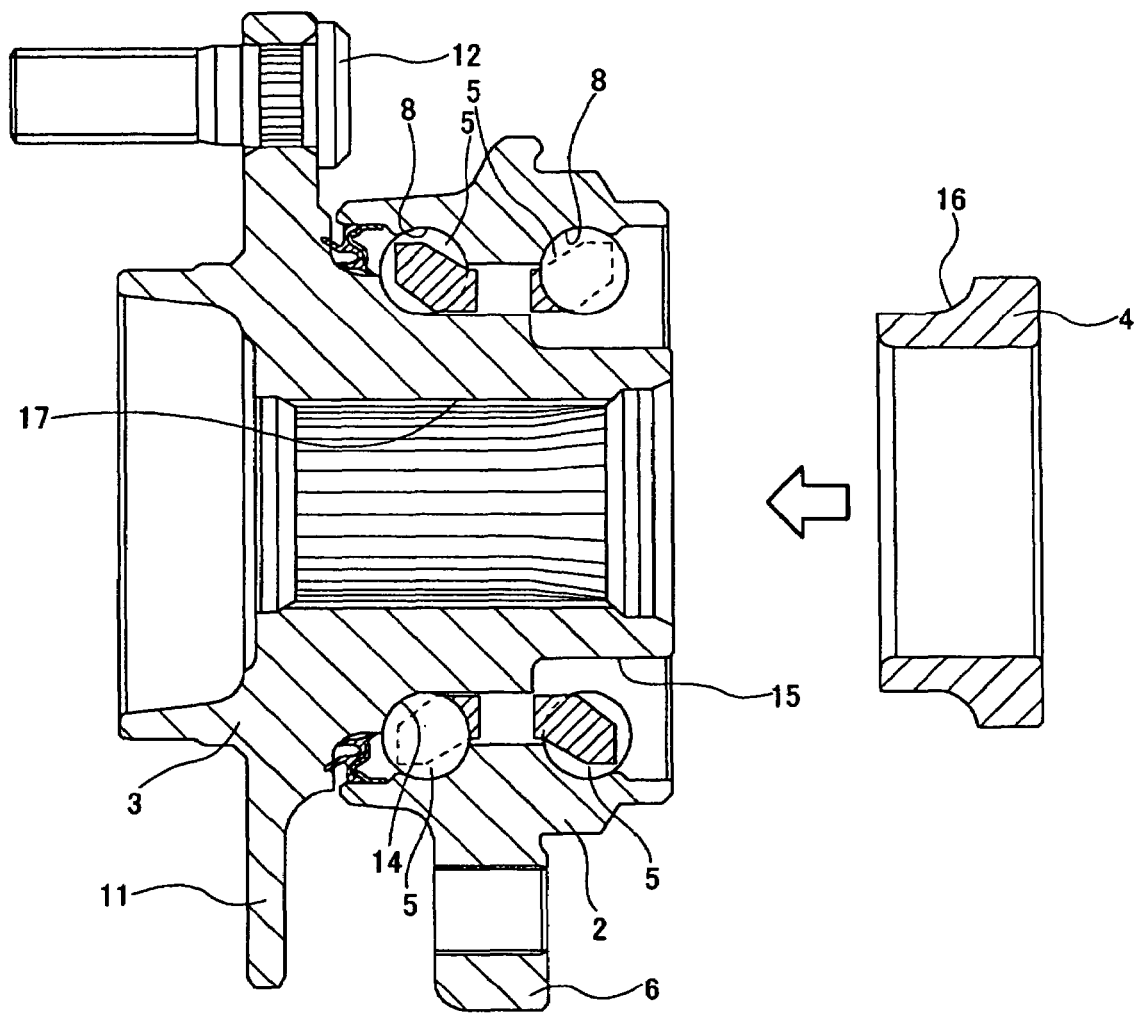
FIG. 8 is a cross-sectional view showing a condition where the respective components except for an inner ring are assembled into the hub.
Figure 30:
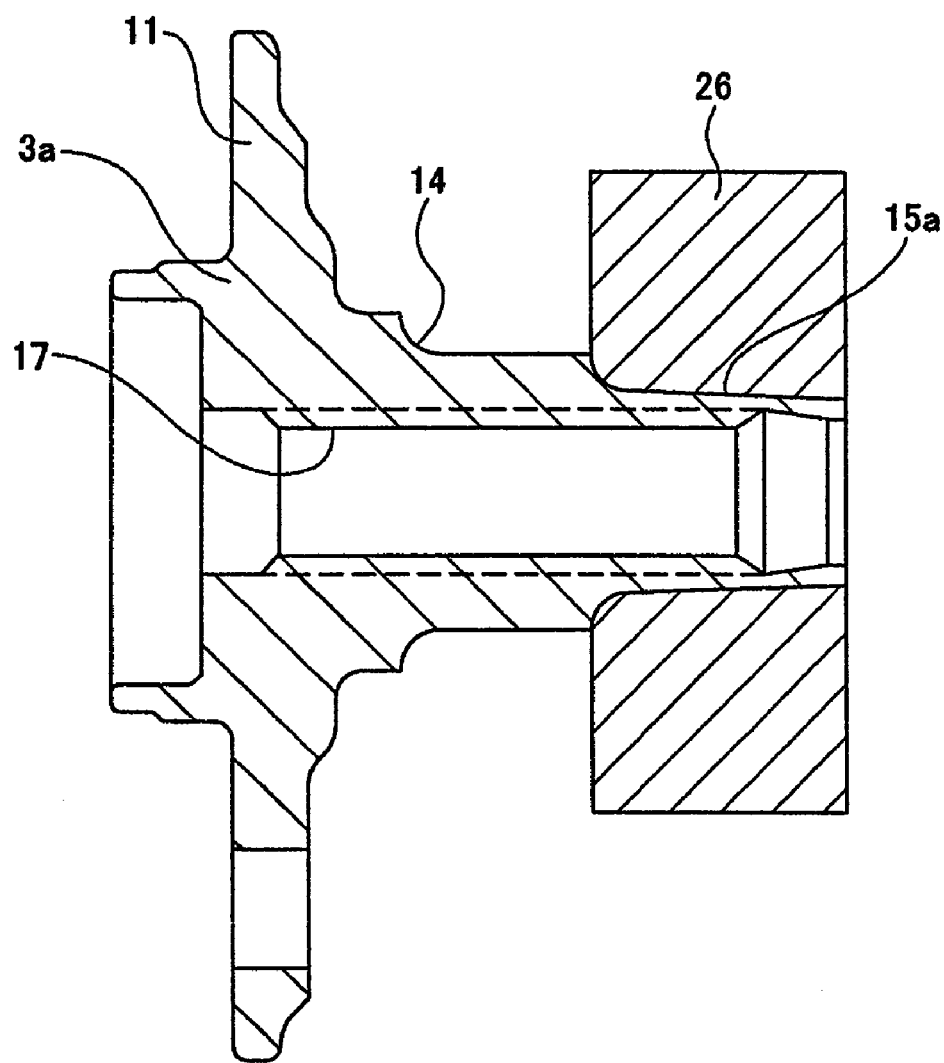
FIG. 30 is a cross-sectional view showing another example of a conventional manufacturing method.

Next, after applying machining and surface treatment as necessary, the respective components except for the inner ring 4 are assembled into the hub 3 as shown in FIG. 8. Then the inner ring 4 is externally secured tightly to the small diameter stepped portion 15 provided on the inside end of the hub 3 as shown in FIG. 1. In the case of this example, even if the inner peripheral surface of the axial inside end of the spline hole 17 is displaced radially inward, caused by the tight fitting, the portion displaced is not protruded radially inward beyond the other portion. In this manner, in the case of this example, the female spline portion for constituting the spline hole 17 can be formed with compensation for the deformation which is caused by externally securing tightly the inner ring 4 to the small diameter stepped portion 15. Therefore, the operation for inserting the spline shaft 19 which is set on the end of the constant velocity universal joint 18 (refer to FIG. 23) into the spline hole 17 can be kept from becoming troublesome. Furthermore, after forming the female spline portion, as described above, the respective holding members 29 are displaced radially outward so as to enlarge the diameter of the inscribed circle constituted by the inner surfaces 31 of the respective holding members 29, more than the outer diameter of the small diameter stepped portion 15. Therefore, there is no abrasion between the outer peripheral surface of the small diameter stepped portion 15 and the inner surfaces 31, and the damage such as the abrasion caused by assembling and taking out the inner ring 4 or the jig 26 (refer to FIG. 30) as described in Japanese Unexamined Patent Publication Nos. 2002-317824- and 2002-327715 can be avoided. By previously subjecting the inner peripheral surfaces of the inner ring 4 and the jig 26 to surface treatment such as coating aimed at decreasing the friction coefficient, damage accompanying taking out the inner ring 4 and the jig, and the occurrence of abrasion powder can be suppressed.

Moreover, if the heat treatment applied to the hub 3 is performed prior to forming the female spline portion, the female spline portion can be made without heat treatment deformation. However, the heat treatment may be applied after forming the female spline portion.

Second Example

Figure 9:
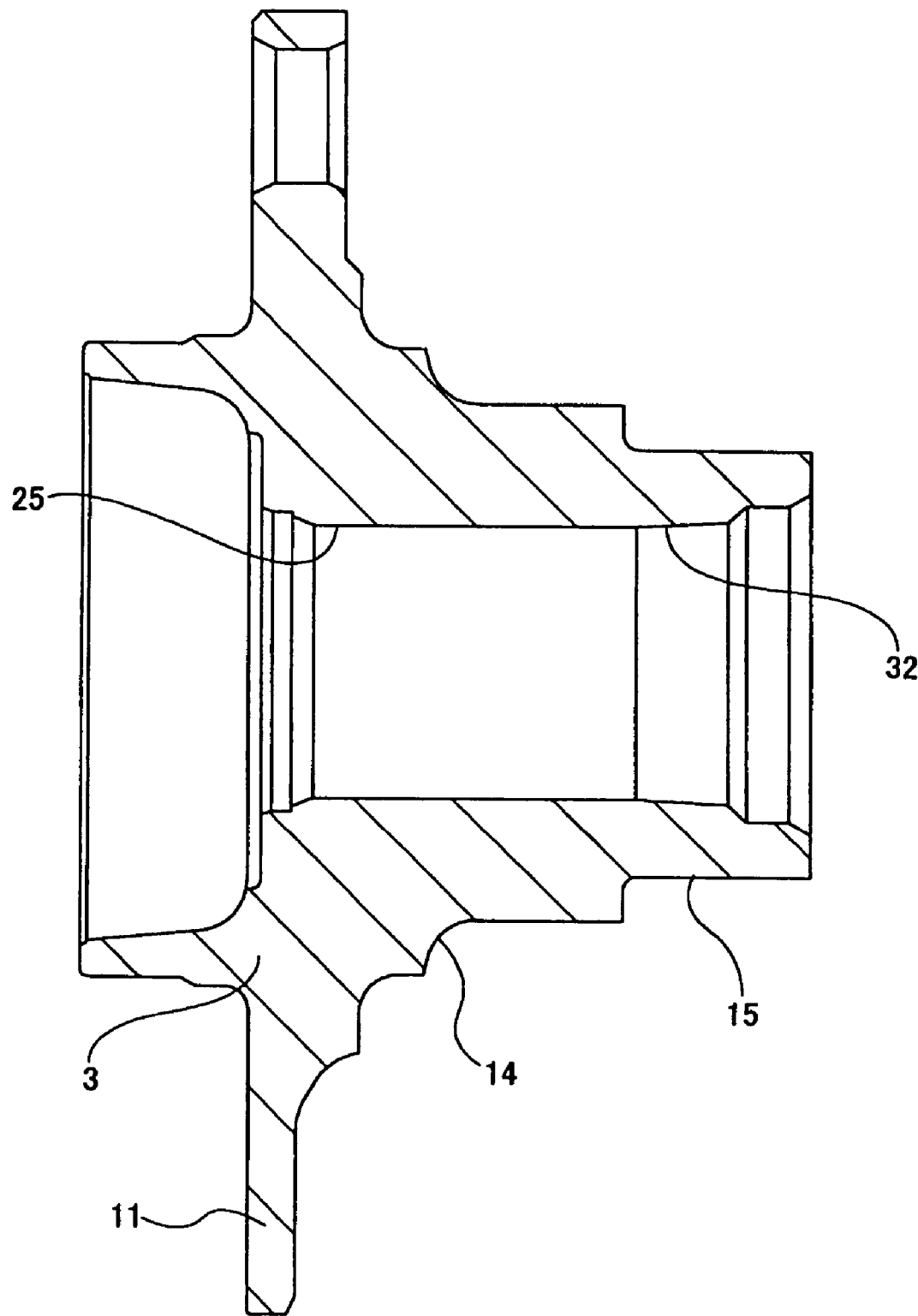
FIG. 9 is a cross-sectional view similar to FIG. 2 showing a second example of the present invention.

FIG. 9 shows a second example of the present invention. In the case of this example, a tapered surface 32 in a conically concave shape which is inclined in the direction such that the inner diameter increases progressing axially inward (to the right in FIG. 9), is provided on a portion superimposed in the radial direction by the small diameter stepped portion 15 provided on the inside end of the hub 3 (right end in FIG. 9), at the inner peripheral surface of the axial inside end of the original hole 25 (spline hole before forming the female spline portion) provided in the center of the hub 3. In the case of this example, in the condition where the inner peripheral surface of the inside end of the original hole 25 is elastically deformed by the holding device 28 (refer to FIG. 3 and the like) to the same degree as the elastic deformation which is caused by externally securing tightly the inner ring 4 (refer to FIG. 1) to the small diameter stepped portion 15, the amount of radially inward protrusion of the inner peripheral surface of the inside end of this original hole 25 can be decreased. Therefore, when pushing the broach, being the cutting device, into the original hole 25, obstruction of the broach can be prevented, and the female spline portion constituting the spline hole can be smoothly formed. The structure of other components and the method for forming the spline hole 17 in the center of the hub 3 are similar to for the abovementioned first example, and hence repeated description is omitted.

Third Example

Figure 10:
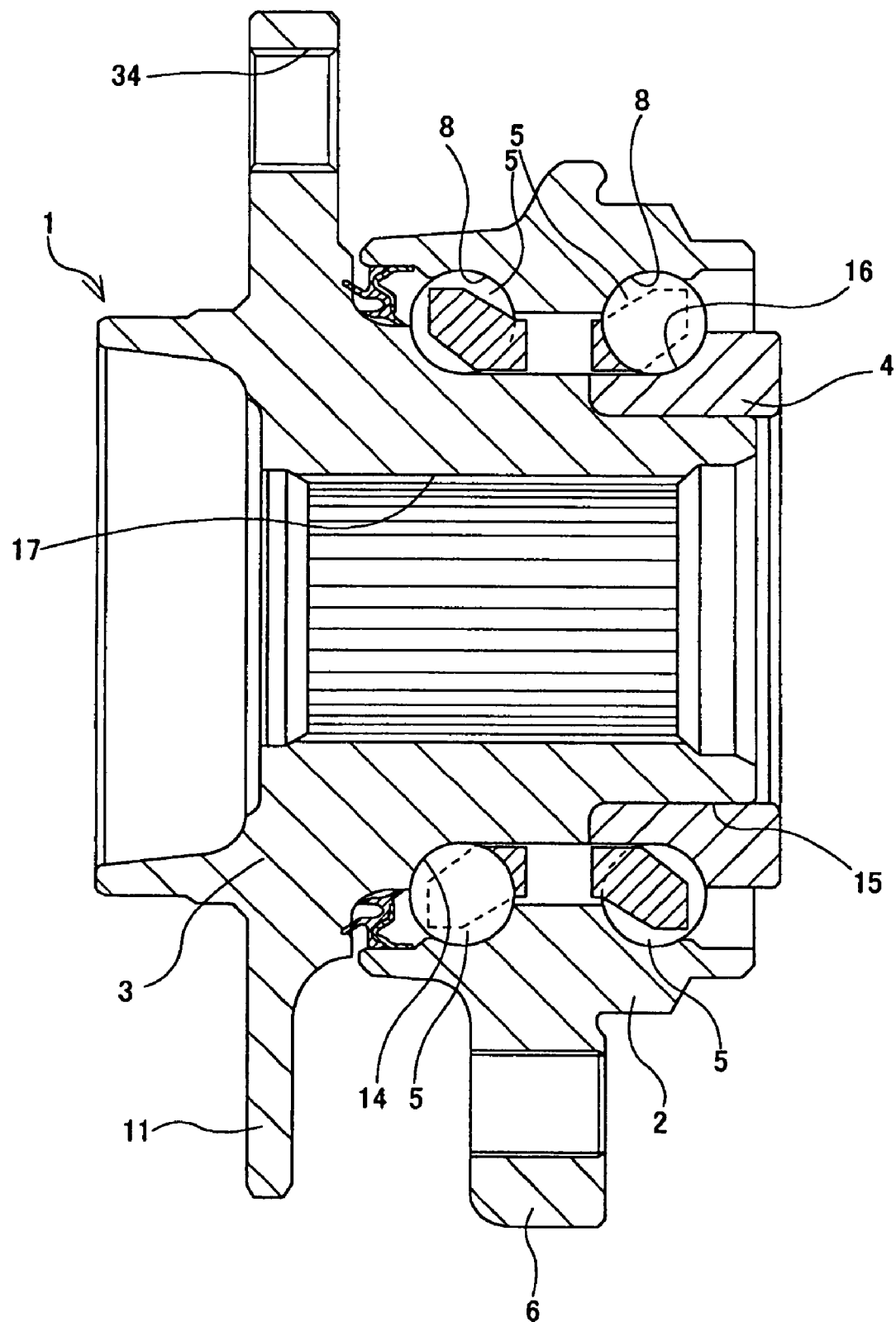
FIG. 10 is a cross-sectional view similar to FIG. 1, showing a third example of the present invention.

FIG. 10 shows a third example of the present invention. In the case of the first example shown in FIG. 1 to 8 described above, studs 12 for supporting a wheel 9 and a disc 10 (refer to FIG. 23) on a second flange 11 provided on the axial outside end side on the outer peripheral surface of the hub 3 are pressed fitted (stud fixed) into through holes 33 (refer to FIG. 1) provided in the second flange 11. On the other hand, in the case of the present embodiment, a plurality screw holes 34 are provided around the circumference direction of the second flange 11 in a condition passing through the second flange 11 in the axial direction, so that the bolts (not shown) for supporting the wheel 9 and the disc 10 can be freely screwed into the respective screw holes 34. The structure of other components, and the method for forming the spline hole 17 in the center of the hub 3, are similar to for the abovementioned first example, and hence repeated description is omitted.

Fourth Example

Figure 11:
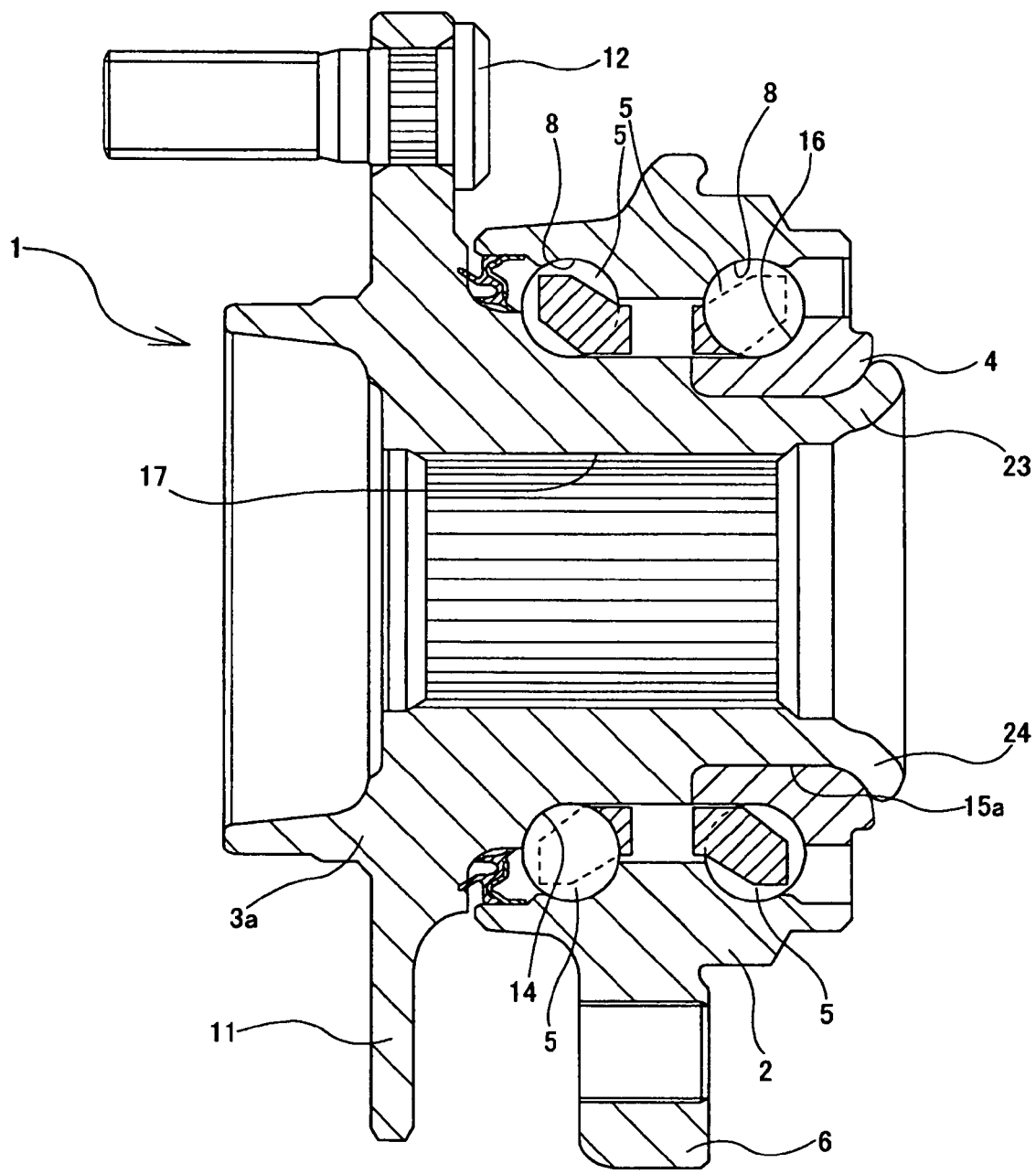
FIG. 11 is a cross-sectional view showing a drive wheel rolling bearing unit manufactured by a method of a fourth example of the present invention.
Figure 12:
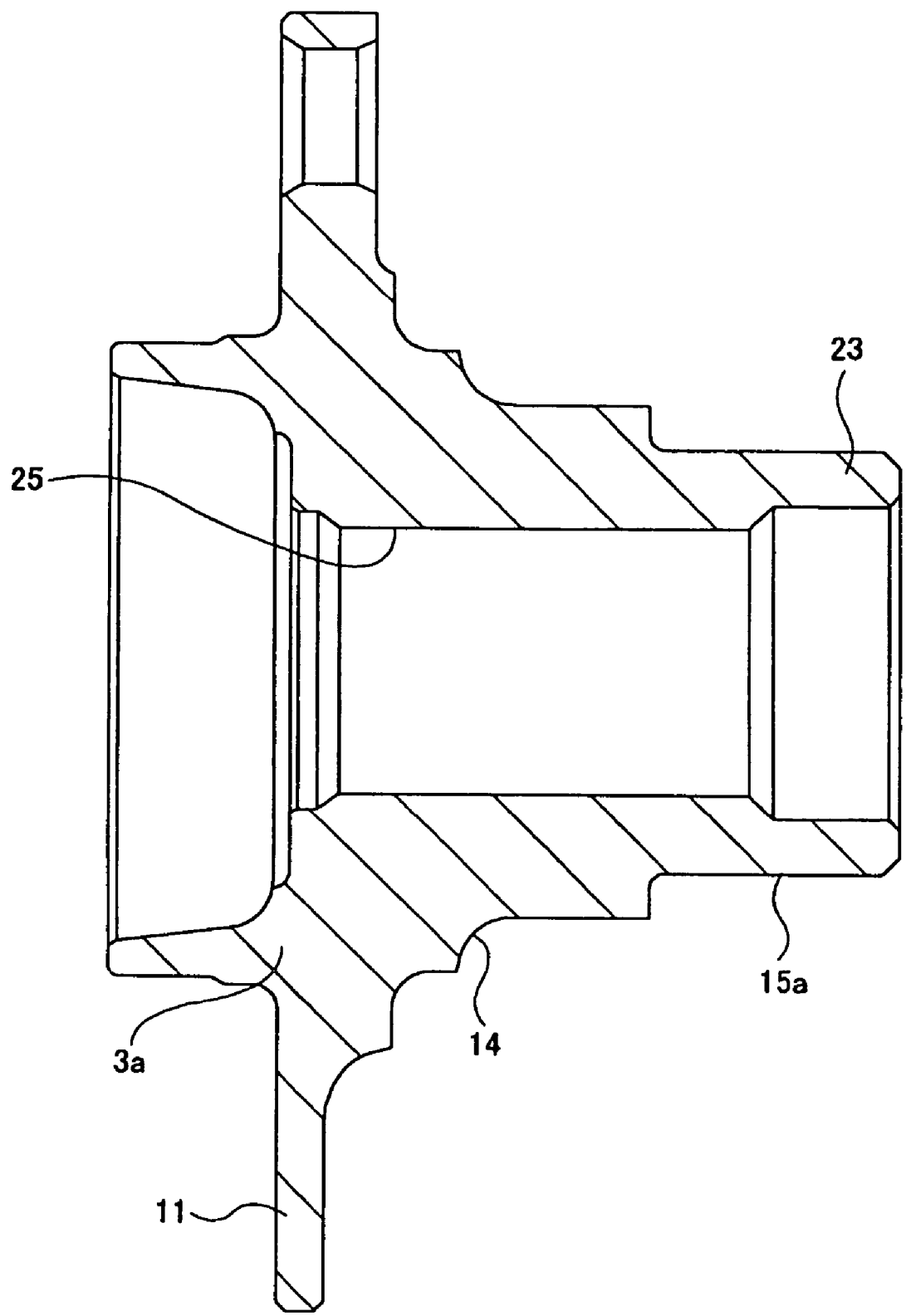
FIG. 12 is a cross-sectional view showing the hub before forming the female spline portion.
Figure 13:
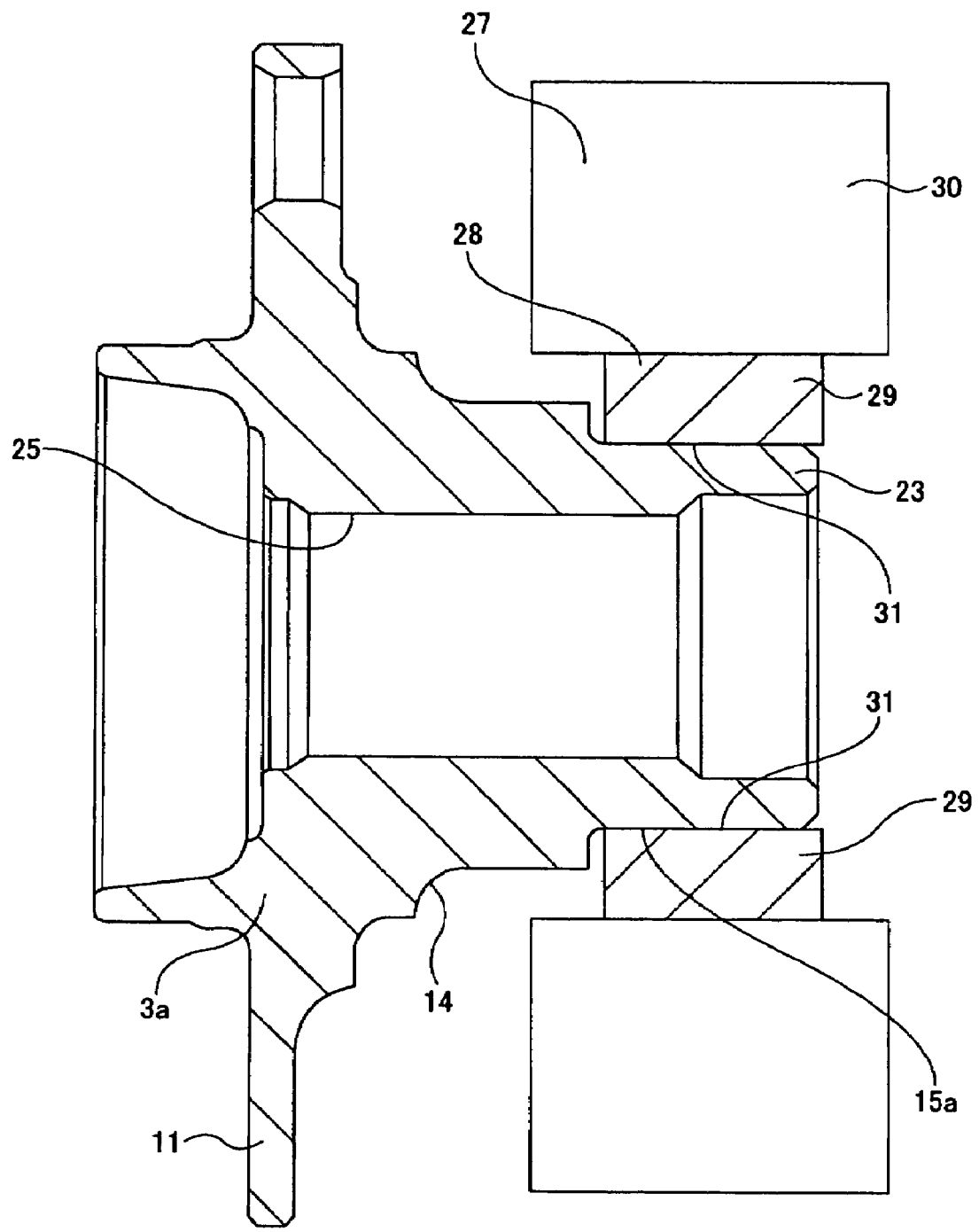
FIG. 13 is a cross-sectional view showing a condition where the hub is supported on the processing apparatus.
Figure 14:
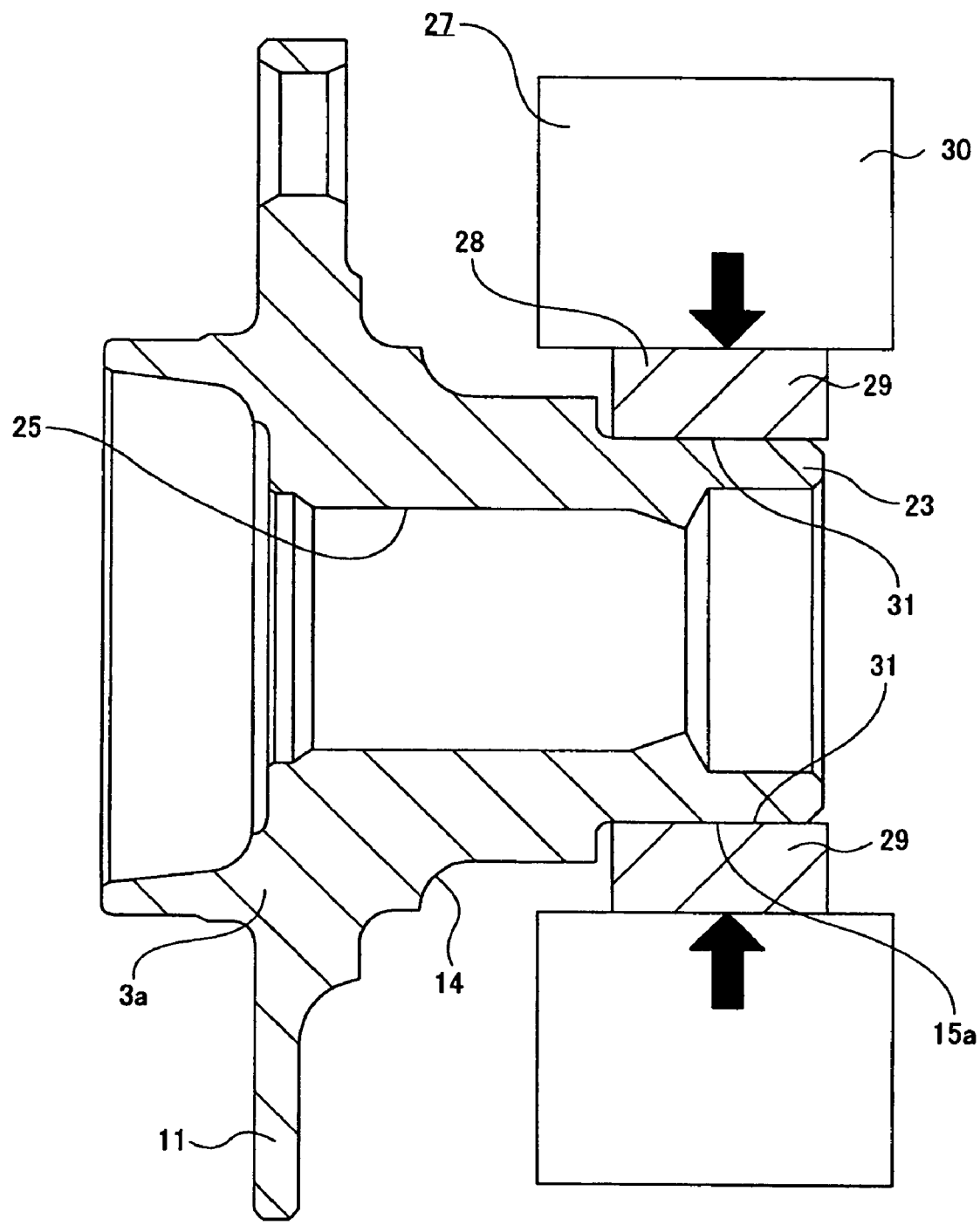
FIG. 14 is a cross-sectional view showing a condition where the inner peripheral surface of the axial inside end of the spline hole is elastically deformed by the holding device.
Figure 15:
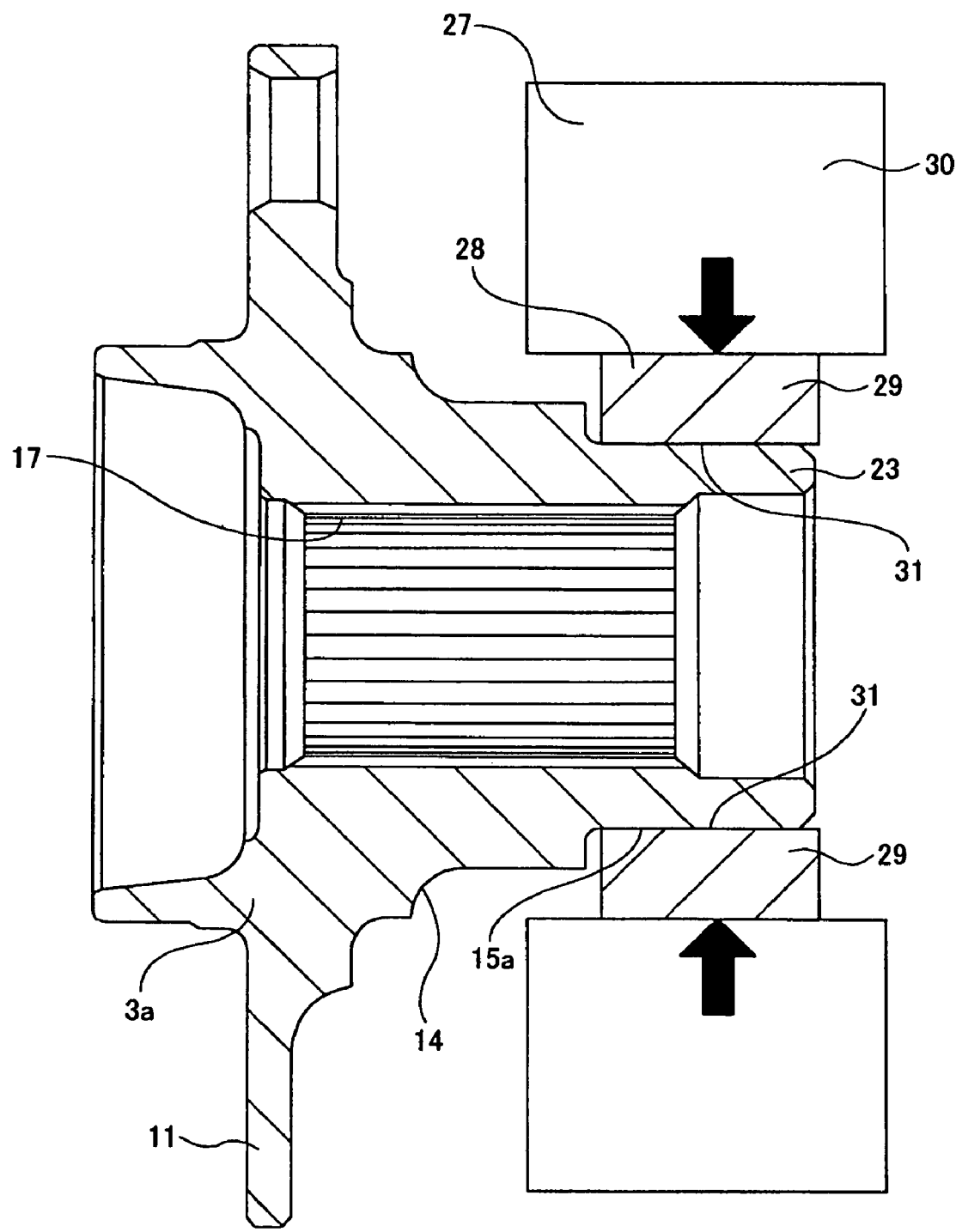
FIG. 15 is a cross-sectional view showing a condition where the female spline portion is formed.
Figure 16:
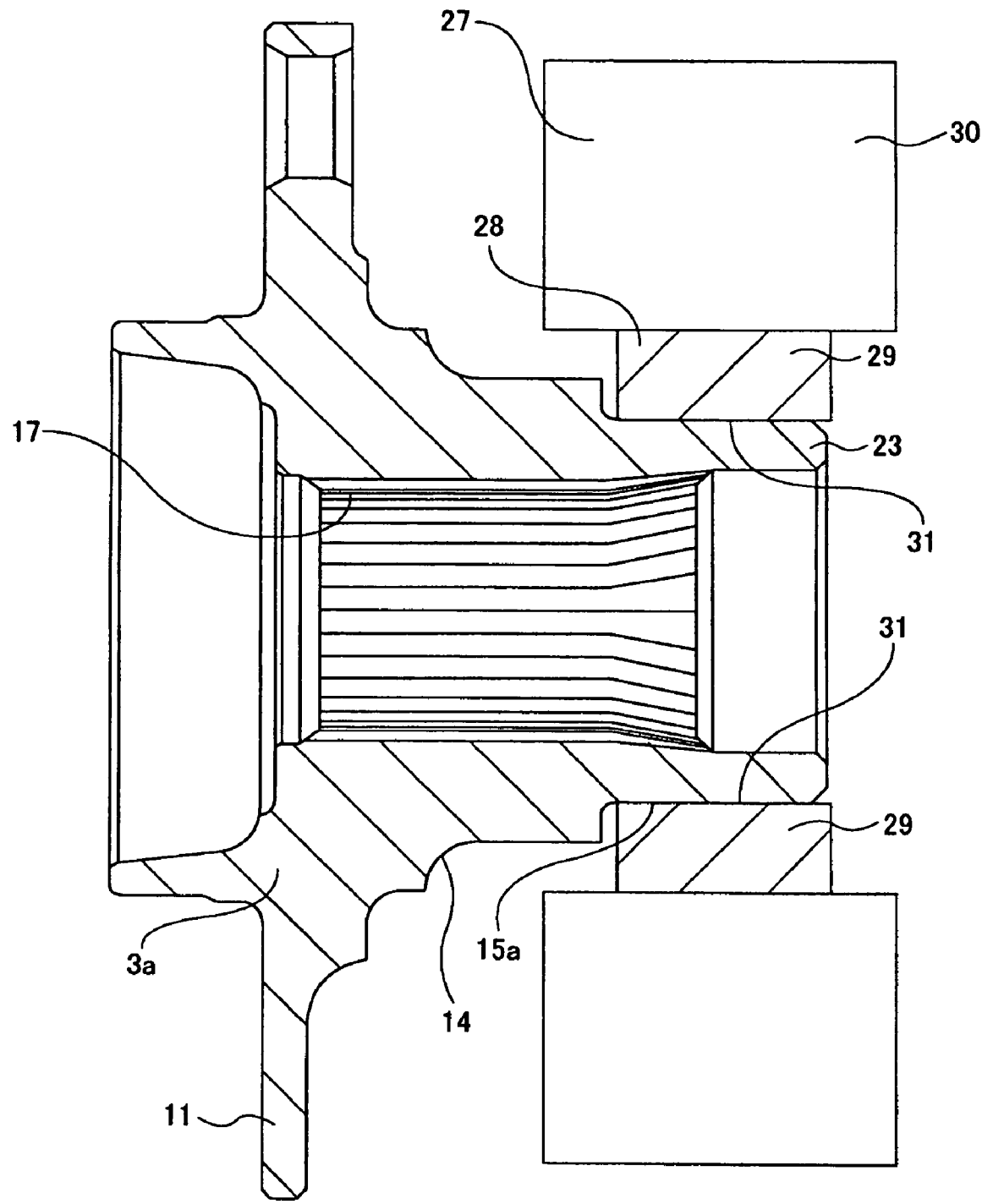
FIG. 16 is a cross-sectional view showing a condition where the elastic deformation of the inner peripheral surface of the inside end of the spline hole is released.
Figure 17:
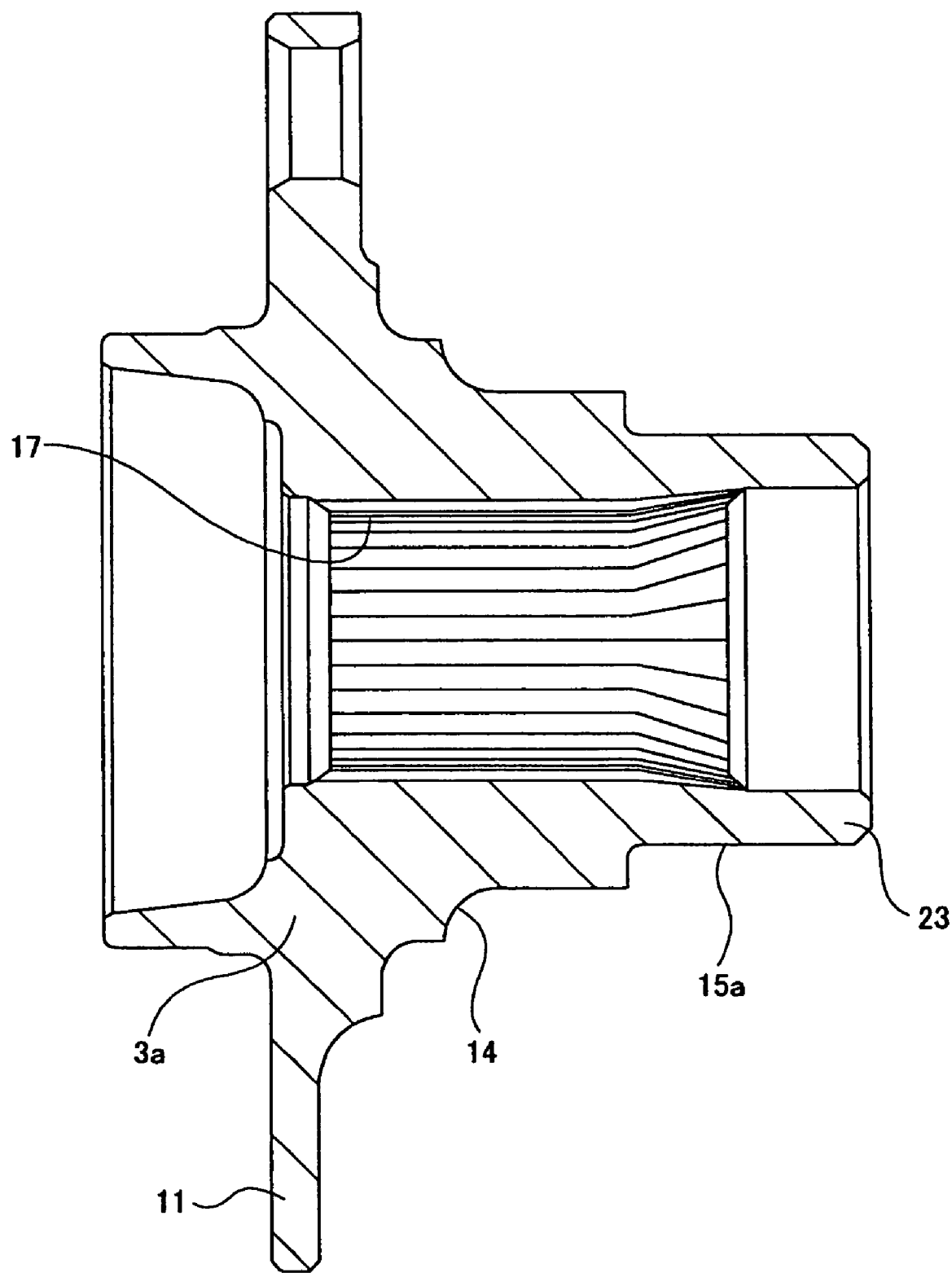
FIG. 17 is a cross-sectional view showing a condition where the hub is taken out from the processing apparatus.
Figure 18:
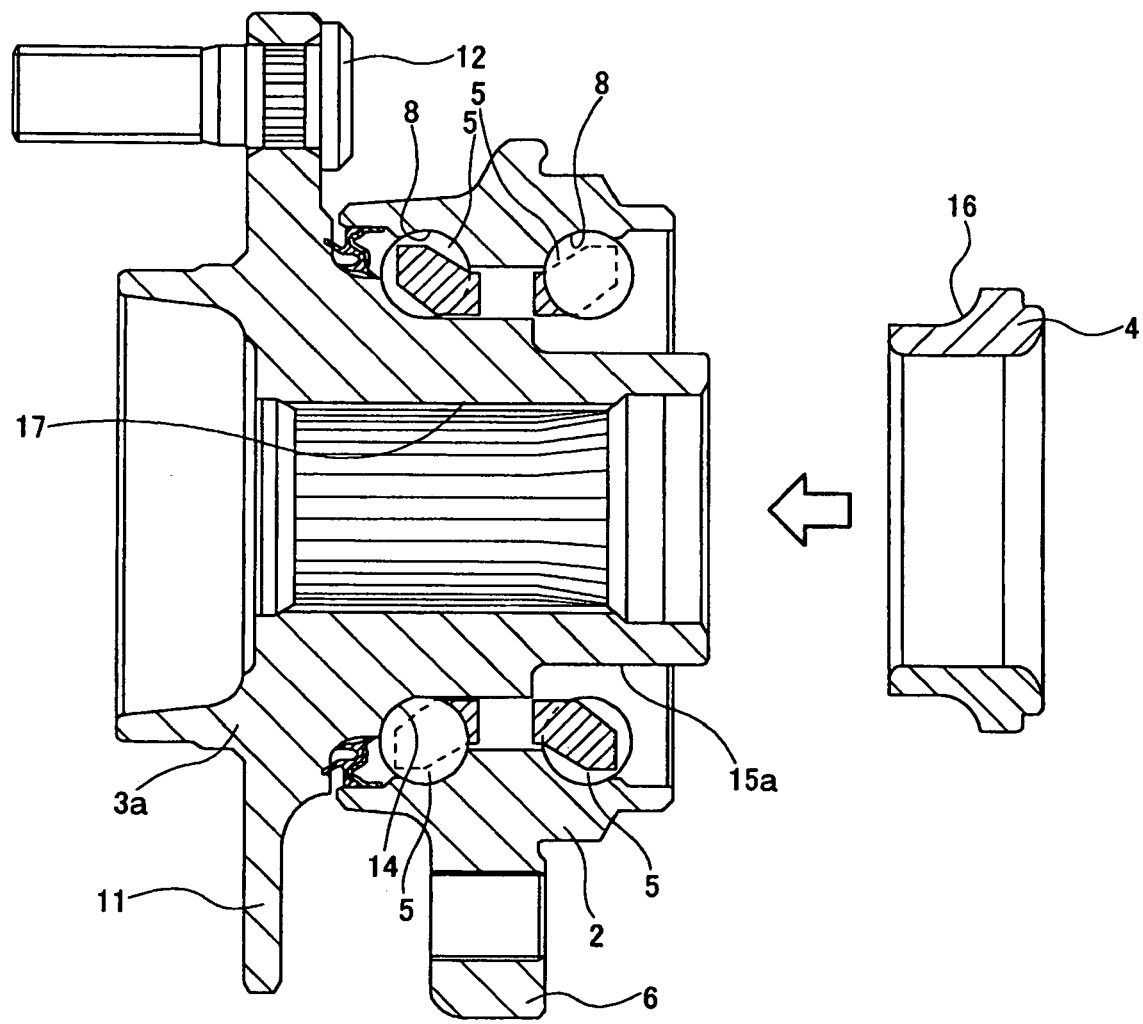
FIG. 18 is a cross-sectional view showing a condition where the respective components except for the inner ring are assembled into the hub.
Figure 19:
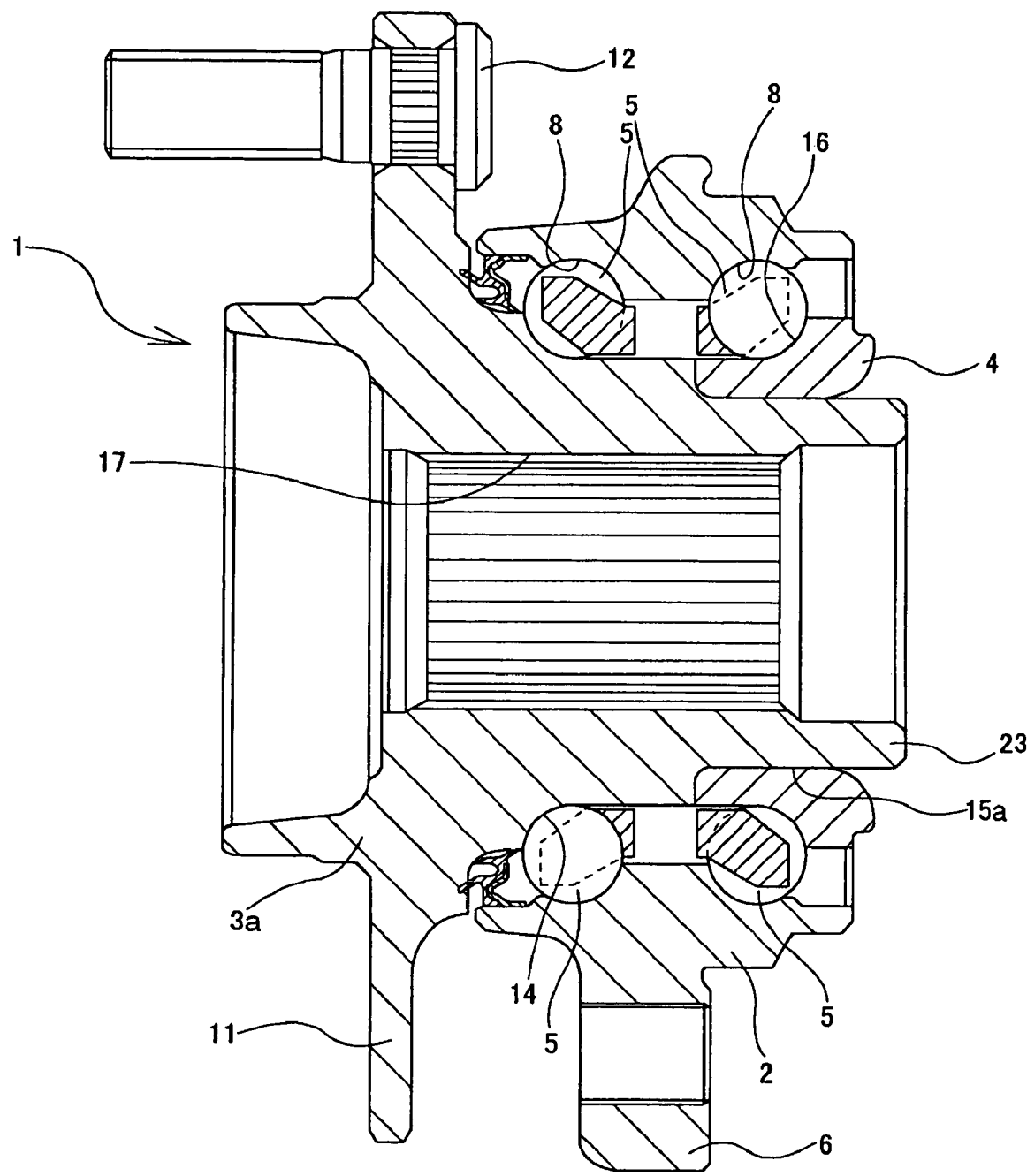
FIG. 19 is a cross-sectional view showing a condition where the inner ring is assembled into the hub.

FIG. 11 to 19 show a fourth example of the present invention in step order. In the case of this example, as shown in FIG. 11, a cylindrical portion 23 existing on a portion protruded axially inward beyond the inner ring 4 which is externally fitted to the small diameter stepped portion 15a on the inside end of the hub 3a, is swaged and expanded (plastically deformed) radially outward to form a crimped portion 24, and the axial inside end surface of the inner ring 4 is clamped by the crimped portion 24. In the case of this example where such a crimped portion 24 is formed, then similarly to the case of the manufacturing method for the first example, the axial inside end of the hub 3 having the original hole 25 formed as shown in FIG. 12 is pressed down by the holding device 28 as shown in FIG. 13. Then, as shown exaggerated in FIG. 14, the inner peripheral surface of the inside end of this original hole 25 is elastically deformed the same as or slightly greater than the elastic deformation caused by externally securing tightly the inner ring 4 to the small diameter stepped portion 15. Then, in this condition, as shown in FIG. 15, the female spline portion for constituting the spline hole 17 is formed into the original hole 25. As the result, as shown in FIGS. 16 and 17, the hub 3 is formed such that the inner diameter of this spline hole 17 increases with progress toward the inside end. Then after forming the female spline portion in this manner, in a condition as shown in FIGS. 18 and 19 with the respective components including the inner ring 4 assembled into the hub 3a, the cylindrical portion 23 is plastically deformed radially outward so as to form the crimped portion 24 shown in FIG. 11.

When forming such a crimped portion 24, if the inner diameter of the axial inside end of the spline hole 17 is contracted due to the formation of this crimped portion 24, as described above, it becomes difficult to insert the spline shaft 19 (refer to FIG. 23) into the spline hole 17. Therefore, as described in Japanese Unexamined Patent Publication No. 2002-339959, the crimped portion 24 is preferably formed by swaging which can be done with a relatively small load, in a condition where a holding jig such as the spline shaft is internally fitted into the spline hole 17. If the crimped portion 24 is formed in this manner, the amount of contraction of the inner diameter of the axial inside end of the spline hole 17 caused by the formation of the crimped portion 24 can be decreased. Considering such contraction of diameter caused by the formation of the crimped portion 24, the female spline portion may be also formed in a condition where the inner peripheral surface of the inside end of this spline hole 17 is elastically deformed the same as or slightly greater than the elastic deformation caused by forming the crimped portion 24. The structure of other components and the method for forming the spline hole 17 in the center of the hub 3 are similar to for the abovementioned first embodiment, and hence repeated description is omitted.

Fifth Example

Figure 20:
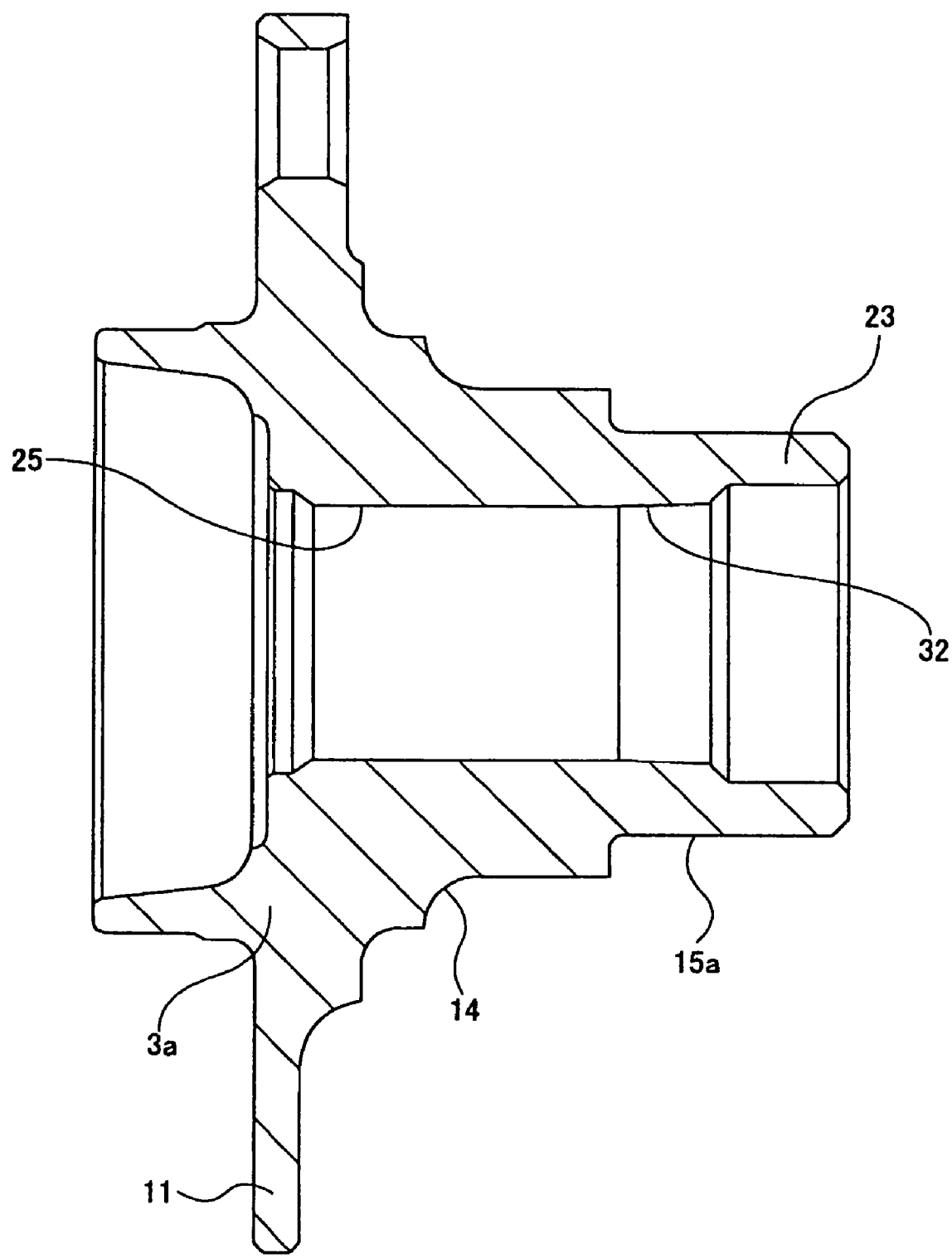
FIG. 20 is a cross-sectional view similar to FIG. 12, showing a fifth example of the present invention.

Next, FIG. 20 shows a fifth example of the present invention. In the case of this example, a tapered surface 32 in a conically concave shape which is inclined in a direction such that the inner diameter increases progressing axially inwards, is provided on a portion superimposed in the radial direction by the small diameter stepped portion 15 provided on the axial inside end of the hub 3a, at the inner peripheral surface of the axial inside end of the original hole 25 (spline hole before forming the female spline portion) provided in the center of the hub 3a. In the case of this example, similarly to the abovementioned second embodiment, when pushing the broach, being the cutting device, into the original hole 25, obstruction of the broach can be prevented, and the female spline portion constituting the spline hole can be smoothly formed. The structure of other components and the method for forming the spline hole 17 in the center of the hub 3 are similar to for the abovementioned fourth example, and hence repeated description is omitted.

Sixth Example

Figure 21:
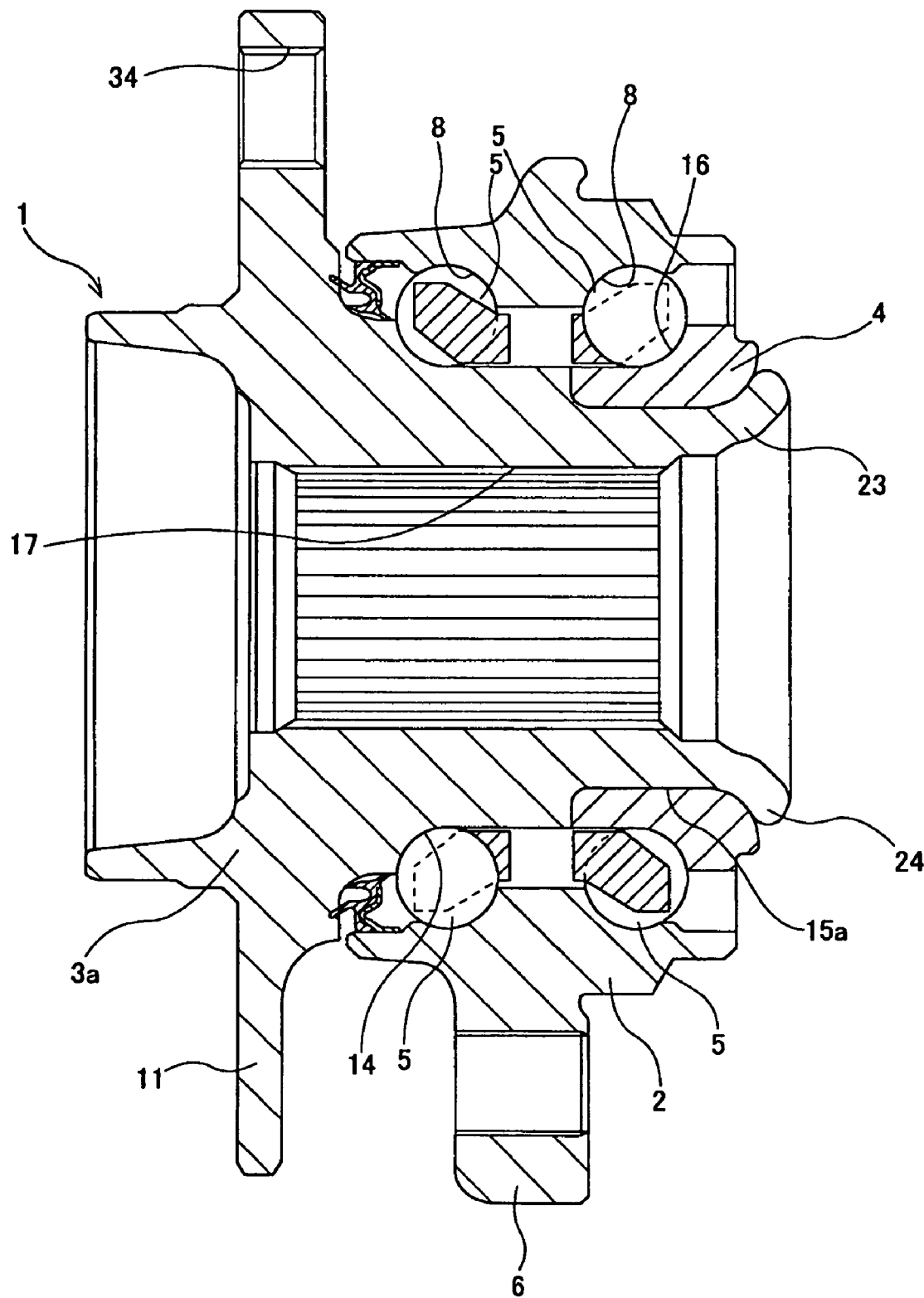
FIG. 21 is a cross-sectional view similar to FIG. 11, showing a sixth example of the present invention.

FIG. 21 shows a sixth example of the present invention. In the case of this example, similarly to the abovementioned third example, a plurality screw holes 34 are provided around the circumference direction of the second flange 11 provided on the axial outside end side on the outer peripheral surface of the hub 3a in a condition passing through the second flange 11 in the axial direction, so that bolts (not shown) for supporting the wheel 9 and the disc 10 can be freely screwed into the respective screw holes 34. The structure of other components and the method for forming the spline hole 17 in the center of the hub 3 are similar to for the abovementioned fourth example, and hence repeated description is omitted.

Seventh Example

Figure 22:
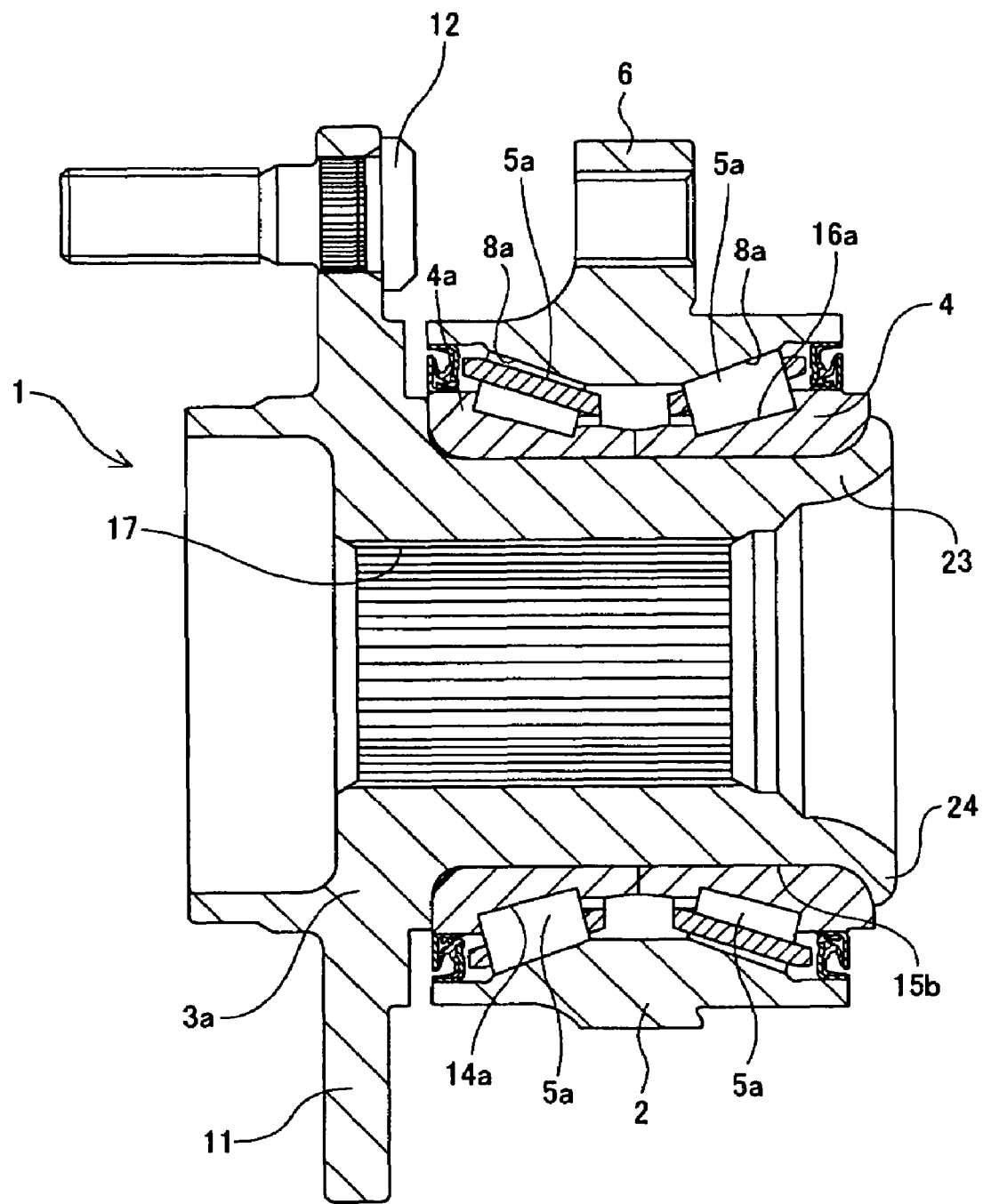
FIG. 22 is a cross-sectional view similar to FIG. 11, showing a seventh example of the present invention.

FIG. 22 shows a seventh example of the present invention. In the case of this example, the respective rolling elements 5a are tapered rollers. In order to fit them, the first and second inner ring raceways 14a and 16a are in a conically convex shape and are inclined in mutually opposite directions, and the respective outer ring raceways 8a are in a conically concave shape which are inclined in mutually opposite directions. In addition, the first inner ring raceway 14a is provided on the outer peripheral surface of another inner ring 4a which is externally secured tightly to the small diameter stepped portion 15b provided on the hub 3a. In the case of this example, the small diameter stepped portion 15b is provided over the entire axial middle portion of the hub 3a to the inside end. A pair of inner rings 4 and 4a (inner ring 4 and another inner ring 4a) provided with the first and second inner ring raceways 14a and 16a on the outer peripheral surface, are externally secured tightly to the small diameter stepped portion 15b. Then, in a condition with the pair of inner rings 4 and 4a externally secured tightly to the small diameter stepped portion 15b, the cylindrical surface portion 23 existing on the portion protruded axially inward beyond the inner ring 4 which is the axially inward ring of the pair of inner rings 4 and 4a, is swaged radially outward (plastically deformed) and the crimped portion 24 is formed.

In the case of this example constituted in this manner, the female spline portion constituting the spline hole 17 is formed in the condition where the inner peripheral surface of the spline hole 17 is elastically deformed radially inward by the holding device 28 constituting the processing apparatus 27 (refer to FIG. 3) described in the first and third examples. That is, by displacing the respective holding members 29 constituting the holding device 28 (refer to FIG. 3) radially inward of the small diameter stepped portion 15b, the inner peripheral surface of the spline hole 17 is elastically deformed the same as or slightly greater than the elastic deformation caused by externally securing the pair of inner rings 4 and 4a tightly to the small diameter stepped portion 15b. Then, in this condition the female spline portion constituting the spline hole 17 is formed by broaching. Of course, considering the contraction of diameter of the spline hole 17 caused by the formation of the crimped portion 24; the female spline portion may be also formed in a condition where the inner peripheral surface of this spline hole 17 is elastically deformed the same as or slightly greater than the elastic deformation caused by forming the crimped portion 24. The structure of other components and the method for forming the spline hole 17 in the center of the hub 3 are similar to for the abovementioned fourth embodiment, and hence repeated description is omitted.

In the above description of the respective examples, the case is used as an example regarding the amount of elastic deformation of the inner peripheral surface of the spline hole 17 when forming the female spline portion, for where the amount of deformation caused by tightly fitting the inner ring 4 (pair of inner rings 4 and 4a), and the amount of deformation caused by forming the crimped portion 24 are separately controlled. However, as required, it may also be preferable to consider and control together both the amount of deformation caused by tightly fitting the inner ring 4 (pair of inner rings 4 and 4a), and the amount of deformation caused by forming the crimped portion 24.

The invention claimed is:

1. A manufacturing method for a drive wheel rolling bearing unit comprising an outer ring, a hub, an inner ring, and a plurality of rolling elements, the outer ring having a first flange for securely connecting a suspension system to an outer peripheral surface, and double-row outer ring raceways on an inner peripheral surface, the hub having a spline hole in the center, a second flange for supporting and fixing a drive wheel, on an axial outside end side of an outer peripheral surface, a first inner ring raceway on an axial middle portion of the outer peripheral surface, and a fitting cylindrical surface portion on an axial inside end side of the outer peripheral surface, the inner ring having a second inner ring raceway on an outer peripheral surface and being externally secured tightly to the fitting cylindrical surface portion, and the plurality of rolling elements being rotatably provided respectively between the double row outer ring raceways and the first and second inner ring raceways, the manufacturing method comprising the steps of:

holding the fitting cylindrical surface portion by a holding device, and contracting an inner diameter of a portion of the holding device which holds the fitting cylindrical surface portion more than an outer diameter of the fitting cylindrical surface portion in a free state, so that the inner peripheral surface of the axial inside end of an original hole of the hub is elastically deformed radially inwards, broaching the inner peripheral surface of the original hole with a cutting device comprising a broach in the condition where the inner peripheral surface of the axial inside end of the original hole is elastically deformed radially inwards so as to form a female spline portion on the original hole with compensation for the deformation caused by externally securing tightly the inner ring to the fitting cylindrical surface portion, thereby forming the spline hole, expanding the inner diameter of the portion of the holding device more than the outer diameter of the fitting cylindrical surface portion, so that the elastic deformation is released, and externally securing tightly the inner ring to the fitting cylindrical surface portion to ensure that the inner peripheral surface of the axial inside end of the spline hole is not protruded radially inward beyond the other portion of the spline hole.

2. A manufacturing method for a drive wheel rolling bearing unit according to claim 1, wherein the inner peripheral surface of the inside end of the spline hole is elastically deformed the same as or slightly greater than an elastic deformation caused by externally securing tightly the inner ring to the fitting cylindrical surface portion.

3. A manufacturing method for a drive wheel rolling bearing unit according claim 1, wherein a first inner ring raceway is provided on the outer peripheral surface of a separate inner ring which is externally secured tightly to the fitting cylindrical surface portion.

4. A manufacturing method for a drive wheel rolling bearing unit according to claim 2, wherein a first inner ring raceway is provided on the outer peripheral surface of a separate inner ring which is externally secured tightly to the fitting cylindrical surface portion.

* * * * *